US010734025B2

(12) United States Patent
Bradley et al.

(10) Patent No.: US 10,734,025 B2
(45) Date of Patent: Aug. 4, 2020

(54) SEAMLESS OUTPUT VIDEO VARIATIONS FOR AN INPUT VIDEO

(71) Applicant: Apple Inc., Cupertino, CA (US)

(72) Inventors: Arwen V. Bradley, Portland, OR (US); Jason Klivington, Portland, OR (US); Charles A. Mezak, San Francisco, CA (US); Etienne Guerard, Cupertino, CA (US); Piotr Stanczyk, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/678,469

(22) Filed: Aug. 16, 2017

(65) Prior Publication Data

US 2018/0336927 A1    Nov. 22, 2018

Related U.S. Application Data

(60) Provisional application No. 62/506,862, filed on May 16, 2017, provisional application No. 62/514,643, filed on Jun. 2, 2017.

(51) Int. Cl.
*G11B 27/00* (2006.01)
*H04N 5/232* (2006.01)
(Continued)

(52) U.S. Cl.
CPC .......... *G11B 27/007* (2013.01); *G11B 27/031* (2013.01); *H04N 5/23248* (2013.01); *H04N 9/79* (2013.01)

(58) Field of Classification Search
CPC ................ G11B 27/007; G11B 27/031; H04N 5/23248; H04N 9/79
See application file for complete search history.

(56) References Cited

U.S. PATENT DOCUMENTS 6,636,220 B1    10/2003 Szeliski
8,503,490 B2    8/2013 Todo
(Continued)

FOREIGN PATENT DOCUMENTS

WO    2014188235 A1    11/2014

OTHER PUBLICATIONS

Bai, et al., "Automatic cinemagraph portraits," In Computer Graphics Forum, vol. 32, pp. 17-25, Wiley Online Library, 2013.
(Continued)

*Primary Examiner* — Thai Q Tran
*Assistant Examiner* — Sunghyoun Park
(74) *Attorney, Agent, or Firm* — Blank Rome LLP

(57) ABSTRACT

Techniques and devices for generating multiple output video variations for an input video based on a shared resource architecture. The shared resource architecture reuses and shares computational and gating results from one or more operations to create the multiple output video variations. The shared resource architecture applies a frame-time normalization of the trimmed and stabilized video to produce a trimmed stabilized normalized video and, thereafter, uses the trimmed stabilized normalized video to precompute one or more video parameters that can be shared with multiple output video variations. The shared resource architecture can then generate multiple output video variations using the shared video parameters.

20 Claims, 16 Drawing Sheets

(51) Int. Cl.
G11B 27/031 (2006.01)
H04N 9/79 (2006.01)

(56) References Cited

U.S. PATENT DOCUMENTS

| | | | | |
|---|---|---|---|---|
| 8,886,017 | B2 | 11/2014 | Kosaka | |
| 9,082,198 | B2 | 7/2015 | Mashiah | |
| 9,779,774 | B1* | 10/2017 | Kang | G06K 9/6218 |
| 9,934,818 | B1* | 4/2018 | Bradley | G11B 27/007 |
| 2003/0156113 | A1 | 8/2003 | Freedman | |
| 2004/0057523 | A1* | 3/2004 | Koto | H04B 1/662 |
| | | | | 375/240.26 |
| 2007/0154072 | A1* | 7/2007 | Taraba | G06K 9/00026 |
| | | | | 382/124 |
| 2010/0054329 | A1* | 3/2010 | Bronstein | H04N 19/147 |
| | | | | 375/240.03 |
| 2012/0206610 | A1* | 8/2012 | Wang | H04N 17/004 |
| | | | | 348/184 |
| 2013/0051771 | A1 | 2/2013 | Yamada | |
| 2013/0229581 | A1 | 9/2013 | Joshi | |
| 2014/0071287 | A1 | 3/2014 | Tu | |
| 2014/0270718 | A1* | 9/2014 | Joset | H04N 19/196 |
| | | | | 386/326 |
| 2014/0327680 | A1* | 11/2014 | Hoppe | G06F 3/048 |
| | | | | 345/473 |
| 2015/0109326 | A1* | 4/2015 | Romano | G09G 5/18 |
| | | | | 345/618 |
| 2015/0318001 | A1* | 11/2015 | Gao | G10L 21/0208 |
| | | | | 704/226 |
| 2016/0086368 | A1 | 3/2016 | Laaksonen | |
| 2016/0189752 | A1* | 6/2016 | Galant | G11B 27/034 |
| | | | | 386/224 |
| 2017/0032819 | A1 | 2/2017 | Sevilla-Lara | |
| 2017/0062006 | A1* | 3/2017 | Plom | G11B 27/007 |
| 2017/0098464 | A1 | 4/2017 | Wang | |
| 2017/0154458 | A1 | 6/2017 | Hoppe | |
| 2018/0025749 | A1* | 1/2018 | Oh | G06K 9/6218 |
| | | | | 386/278 |

OTHER PUBLICATIONS

Bai, et al., "Selectively de-animating video," ACM Trans. Graph., 31(4):66, 2012.
Beck, et al., "Cinemagraphs," 2012.
Boykov, et al., "An experimental comparison of min-cut/max-flow algorithms for energy minimization in vision," Pattern Analysis and Machine Intelligence, IEEE Transactions on, 26(9):1124-1137, 2004.
Boykov, et al., "Fast approximate energy minimization via graph cuts," Pattern Analysis and Machine Intelligence, IEEE Transactions on, 23(11):1222-1239, 2001.
Cohen, et al., "The moment camera," Computer, 39(8):40-45, 2006.
Conley, et al., "Motion Stills—Create beautiful GIFs from Live Photos," Jun. 7, 2016 Retrieved from the Internet: URL: https://research.googleblog.com/2016/06/motion-stills-create-beautiful-gifs.html?m=1.
Horn, B. K. P. & Schunck, B. G., "Determining Optical Flow," Artificial Intelligence 17, 185-203, 1981.
Joshi, et al., "Cliplets: juxtaposing still and dynamic imagery," In Proceedings of the 25th annual ACM symposium on User interface software and technology, pp. 251-260, ACM, 2012.
Kolmogorov, et al., "What engergy functions can be minimized via graph cuts?," Pattern Analysis and Machine Intelligence, IEEE Transactions on, 26(2):147-159, 2004.
Liao, et al., "Automated Video Looping with Progressive Dynamism," ACM Trans. Graphics (SIGGRAPH), 32(4), 2013.
Lucas et al., "An iterative image registration technique with an application to stereo vision," In Proceedings of the 7th International joint conference on Artificial Intelligence—vol. 2 (IJCAI '81), 1981, vol. 2, pp. 674-679.
Schodl, et al., "Video textures," In Proceedings of the 27th annual conference on Computer graphics and interactive techniques, pp. 489-498, ACM Press/Addison-Wesley Publishing Co., 2000.
Tompkin, et al., "Towards moment imagery: Automatic cinemagraphs," In Visual Media Production (CVMP), 2011 Conference for, pp. 87-93, IEEE, 2011.
Zhou, et al-, "Learning deep features for scene recognition using places database," In Advances in Neural Information Processing Systems, pp. 487-495, 2014.

* cited by examiner

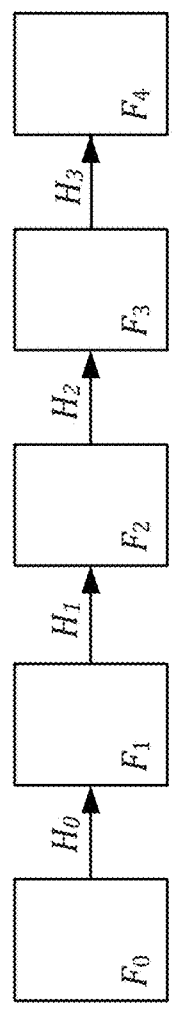
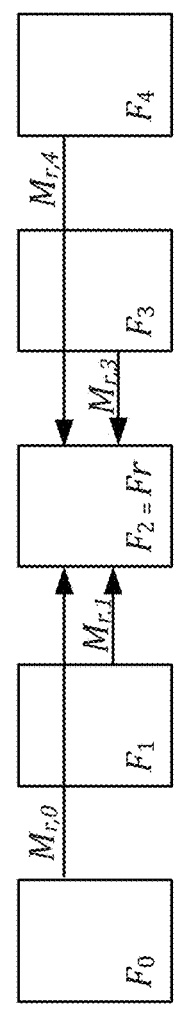

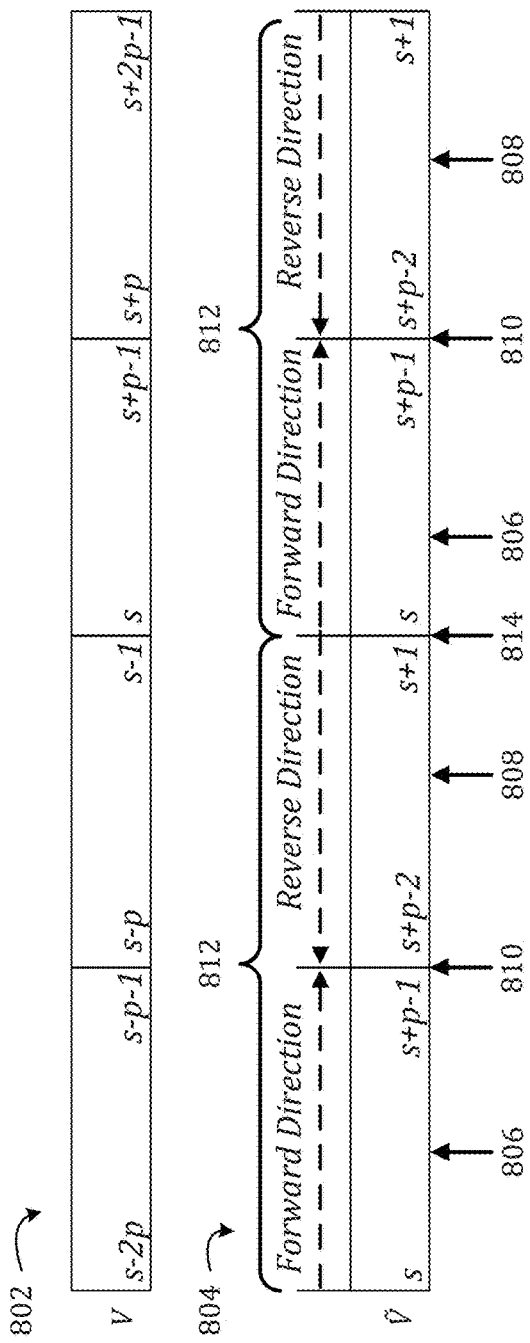
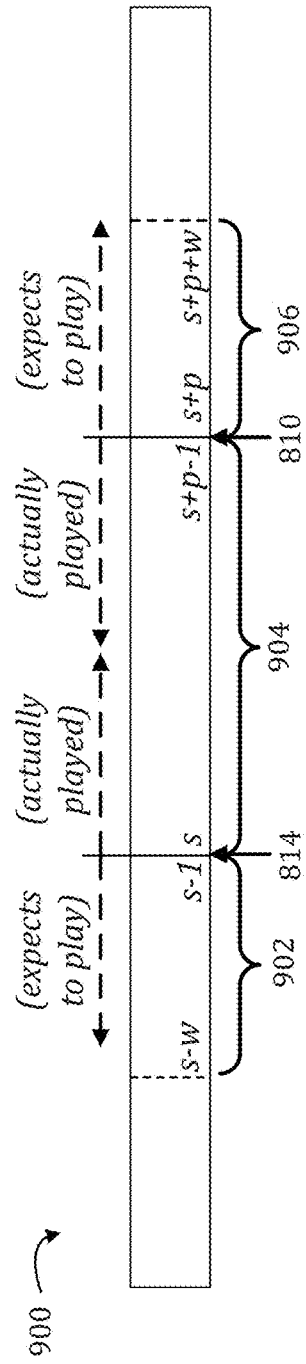
FIG. 8
FIG. 9

SEAMLESS OUTPUT VIDEO VARIATIONS FOR AN INPUT VIDEO

CROSS-REFERENCE TO RELATED APPLICATIONS

This application claims the benefit of U.S. Provisional Patent Application No. 62/506,862 filed May 16, 2017 by Arwen V. Bradley et al. and entitled "Seamless Forward-Reverse Video Loops" and U.S. Provisional Patent Application No. 62/514,643 filed Jun. 2, 2017 by Arwen V. Bradley et al. and entitled "Seamless Output Video Variations for an Input Video," all of which are hereby incorporated by reference as if reproduced in their entirety.

BACKGROUND

This disclosure relates generally to the field of video processing, and more particularly, but not by way of limitation, this disclosure relates to automatically creating a seamless output video variations, such as video loops, from a casually shot handheld video or a sequence of images.

Visual imagery can generally be classified as either a static image (e.g., photograph, painting, etc.) or a dynamic image (e.g., video, animation, etc.). A static image captures a single instant in time while a dynamic image can provide an unfolding temporal narrative through time. Differing types of short videos can be created from multiple static images or a dynamic image. Examples of short videos include cinemagraphs and cliplets, which selectively freeze, play, and loop video regions to achieve compelling effects. For instance, cinemagraphs can commonly combine static scenes with small repeating movements (e.g., a hair wisp blowing in the wind); thus, some motion and narrative can be captured in a cinemagraph. In a cinemagraph, the dynamic element is commonly looping in a series of frames to create a video loop. In order to create smoother animations and minimize visual artifacts, a user may create cinemagraphs by using pre-planned, tripod-mounted footage and subsequently manually identify relevant frames that produce a smooth video loop. However, a user may wish to automatically create a video loop and/or other output video variations from different types of video inputs, such as handheld videos or static images taken with a portable device that produce the same quality as pre-planned cinemagraphs but without the painstaking effort and time consumption.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment, the disclosure provides a method for generating a seamless video loop created from a dynamic input video or from multiple static images. The output video loop is created by identifying optimal loop parameters, such as a start frame within the input video and a frame length parameter, based on a temporal discontinuity minimization. The selected start frame and the frame length parameter may indicate a reversal point within the Forward-Reverse Loop output video. The Forward-Reverse Loop output video may include a forward segment that begins at the start frame and ends at the reversal point and a reverse segment that starts after the reversal point and plays back one or more frames in the forward segment in a reverse order.

In another embodiment, the method outputs a video loop by applying a frame-time normalization an input video prior to identifying optimal loop parameters. The frame-time normalization enforces a constant frame rate for the input video. Afterwards, the method applies an energy function to the frame-time normalized input video to select a starting frame and a length for a forward segment of the video loop. The energy selects the starting frame and the length of the forward segment by minimizing the temporal discontinuity of the video loop. To minimize the temporal discontinuity, the method may determine the differences between expected frames that playback after a reversal point according to the input video and actual frames that playback after the reversal point according to a reverse segment In another embodiment, the method implements a rendering pipeline for a Forward-Reverse Loop video sequence that balances memory usage and computing latency. For a Forward-Reverse Loop video sequence that includes a forward segment and a reverse segment, the method is able to read and write each frame within the forward segment. After each write for the frames within the forward segment, the method deletes each of the frames within memory. To render the reverse segment of the Forward-Reverse Loop video sequence, the method reads a chunk of frames within the reverse segment into memory. After writing each frame within the chunk of frames, each frame is deleted from memory.

In one embodiment, the disclosure provides a method for generating multiple output video variations for an input video based on a shared resource architecture. The shared resource architecture reuses and shares computational and gating results from one or more operations to create the multiple output video variations. The method may obtain a trimmed and stabilized video and subsequently process the trimmed and stabilized video to obtain an output video variation. To obtain other output video variations, the method may apply a frame-time normalization of the trimmed and stabilized video to produce a trimmed stabilized normalized video and, thereafter, may use the trimmed stabilized normalized video to precompute one or more video parameters that can be shared with the other output video variations. The method can then generate multiple output video variations using the video parameters. The method may also use pregate operations to determine an input video's compatibility for implementing one or more of the output video variations and post gate operations to determine whether the generated output video variation is of relatively high quality.

In one embodiment, the disclosure provides a method for playing back one or more output video variations for an input video in real-time. After generating a video recipe associated with an output video variation, a custom media player may playback the output video variation on the fly so as to avoid extra cycles normally needed when encoding and decoding the video recipes when rendering offline. The disclosed medial player may be configured to playback output video variations frame-by-frame by smoothing out any non-uniform timing rates.

In one embodiment, each of the above described methods, and variation thereof, may be implemented as a series of computer executable instructions. Such instructions may use any one or more convenient programming language. Such instructions may be collected into modules and/or programs and stored in any media that is readable and executable by a computer system or other programmable control device.

BRIEF DESCRIPTION OF THE DRAWINGS

FIG. 3A illustrates a method for using tripod-sequential mode stabilization of frames of an input video during video stabilization in accordance with one embodiment.

FIG. 3B illustrates a method for using tripod-direct mode stabilization of frames of an input video during video stabilization in accordance with one embodiment.

FIG. 8 illustrates an embodiment of an input video and an embodiment of a Forward-Reverse Loop output video.

FIG. 9 is a diagram of the sequence of frames from an input video involved to determine optimal loop parameters for a Forward-Reverse Loop output video.

DESCRIPTION

Figure 1:
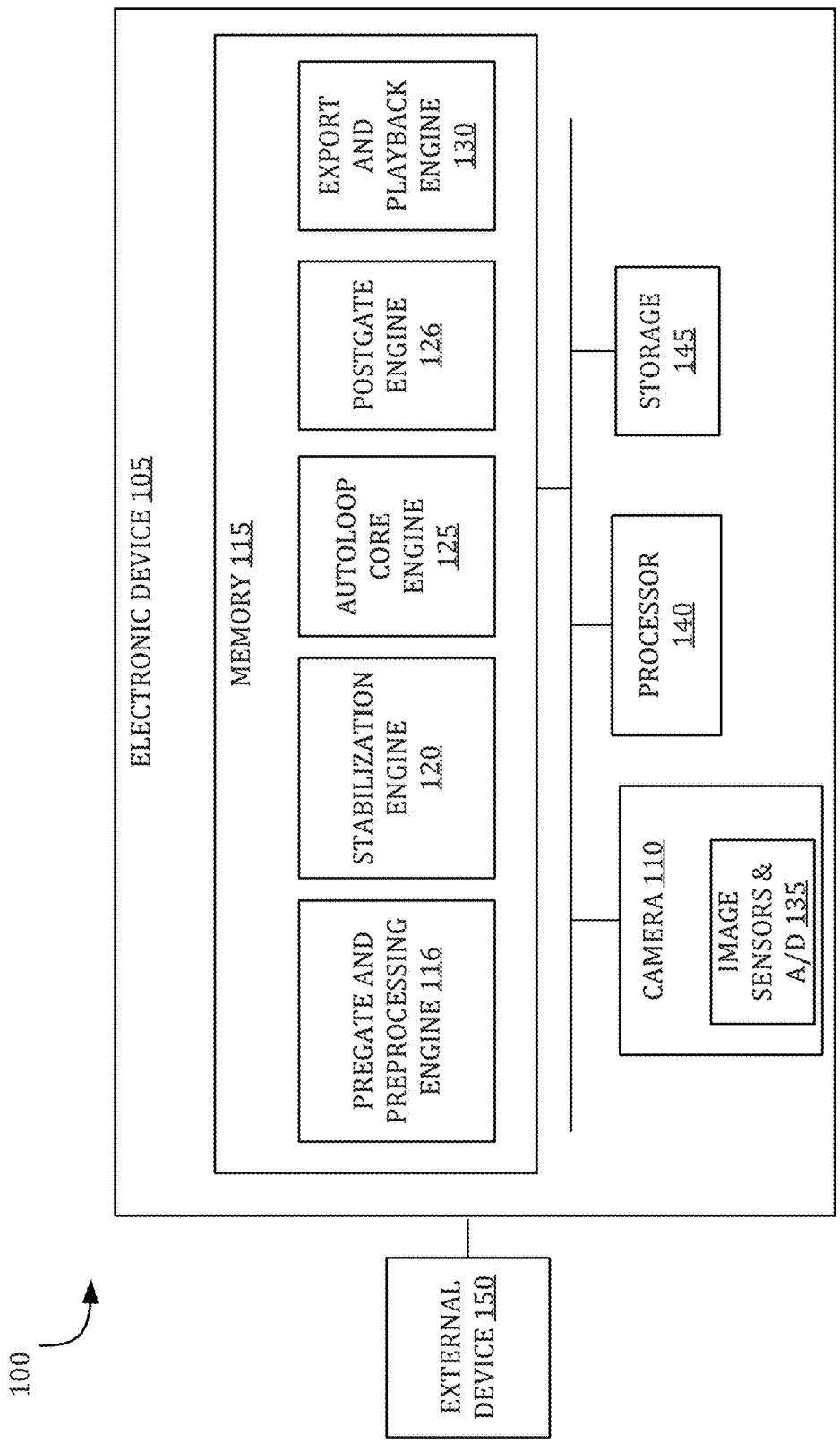
FIG. 1 depicts a simplified block diagram of a system in accordance with one embodiment.

This disclosure includes various example embodiments for creating a video loop that continuously loops back to start of a video and/or sequence of images upon completion of the video and/or sequence of images (hereinafter "AutoLoop output video"). Specifically, one or more embodiments create an AutoLoop output video from handheld raw input videos or a series of images encoded using one or more color representations (e.g., YCbCr or RGB format). AutoLoop output videos may be created from short burst video clips of at least one second, burst sequences, iris frame sequences (e.g., live photos), slow motion video clips, or time-lapse videos. The pipeline for creating an AutoLoop output video can include obtaining a raw input video and/or a sequence of images, performing pregate and preprocessing operations, stabilizing the raw input video using one or more stabilization operations, selecting and optimizing AutoLoop parameters, adding synthetic camera motion, and performing postgate operations. In the described illustrative embodiments, either a consensus AutoLoop operation or a per-pixel AutoLoop operation may be applied to determine the loop parameters, such as a starting frame, a loop period, and crossfade length. The techniques disclosed herein regarding creating AutoLoops are applicable to any number of electronic devices, such as digital cameras, digital video cameras, mobile phones, personal data assistants (PDAs), portable entertainment players, and, of course, desktop, laptop, and tablet computer systems.

This disclosure also includes various example embodiments for creating one or more Forward-Reverse Loop video sequences (hereinafter "Forward-Reverse Loop output video"). A Forward-Reverse Loop video sequence plays a sequence of frames starting from a selected start frame in a forward time direction until reaching an end frame and, immediately thereafter, plays the frames leading up to the end frame in a reverse time direction. Similar to AutoLoop output videos, one or more embodiments may create the Forward-Reverse Loop output video from handheld raw input videos or a series of images encoded using one or more color representations. The Forward-Reverse Loop output video may be created from short burst video clips of at least one second, iris frame sequences (e.g., live photos), slow motion video clips, or time-lapse videos. An operation for creating a Forward-Reverse Loop output video can include obtaining a raw input video and/or a sequence of images, performing pregate and preprocessing operations, stabilizing the input video using one or more stabilization operations, performing frame-time normalization on the input video, optimizing Forward-Reverse Loop parameters, performing postgate operations, and rendering the Forward-Reverse Loop output video. In the described illustrative embodiments, rather than applying an AutoLoop operation (e.g., a consensus AutoLoop operation) a Forward-Reverse Loop operation may determine optimal loop parameters, such as a starting frame and a length for a forward segment of the Forward-Reverse Loop video sequence. The Forward-Reverse Loop operation may not perform crossfades since the transitions at reversal points are typically less abrupt than the transitions in an AutoLoop operation. In one embodiment, the Forward-Reverse Loop operation may determine optimal loop parameters by implementing an energy function that penalizes the differences between frames that are actually displayed and frames that are expected to play based on the input video around the reversal point (e.g., frames before or after the reversal point).

This disclosure also includes various example embodiments for creating multiple output video variations from an input video using a shared resource architecture. Examples of output video variations include an AutoLoop output video, a Forward-Reverse output video, and a Long Exposure output video. Rather than implementing multiple independent pipelines to create each output video variation separately, the shared resource architecture is able to reuse and share results obtained from operations common to generating at least some of the output video variations. In one embodiment, the shared resource architecture may perform a pregate trimming operation and a stabilization operation that produces computational and/or gating results (hereinafter collectively referred to as "results" in this disclosure) that are applicable to the creation of multiple output video variations. For instance, the results from the two aforementioned operations may be shared to evaluate operations that determine whether the input video is appropriate for producing one or more output video variations and/or applied to multiple operations for creating various output video variations. The shared resource architecture may also share results from a frame-time normalization operation and a precompute operation with operations that create several other output video variations (e.g., AutoLoop and Forward-Reverse Loop). The shared resource architecture may also perform postgate operations that compute certain gating decisions (e.g., dynamism) and can even share results with other postgate operations that evaluate other output video variations. In one embodiment, each of the output video variations may be played back in real-time for display on a user interface.

This disclosure also includes various example embodiments for real-time playback of one or more output video variations. In one embodiment, an audio/video media framework, such as AVFoundation, may create a custom media player to playback the output video variation frame-for-frame. Providing real-time playback using the custom media player removes both an encoding and decoding cycle that may exist when rendering output video variations offline. After generating a video recipe associated with an output video variation, the audio/video media framework may loop over instructions within the video recipe to insert a time-range into the primary video track at the specified presentation output time for the output video variation. The time-range may contain the input time and the input duration. The audio/video media framework may also provide frame retiming by normalizing the time ranges to achieve a constant frame rate. For blending and/or crossfade instructions in the video recipe, the audio/video media framework may insert another time range into a secondary video track. When audio also exists in the video recipe, the audio/video media framework may employ a similar operation as frame timing to provide the corresponding audio timing for the output video variation. By forming a very granular description, the audio/video media framework may delegate implementation of the retiming to the player component.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

FIG. 1 shows, in block diagram form, an overall view of a system 100 for creating an automated seamless AutoLoop output video. In one embodiment, system 100 may generate an AutoLoop output video without additional user interaction beyond selecting an input video or multiple images (e.g., a series and/or a sequence of images) to create the AutoLoop output video. To achieve a moving photograph effect, an AutoLoop output video may include dynamic scene elements that move against a stationary background. The system 100 may create the AutoLoop output video using casually shot, handheld videos rather than using input videos shot with a tripod. The system 100 may not request for other user interactions, such as manually identifying loopable frames and/or manually using tools that offload the video content onto computer systems. Additionally or alternatively, the system 100 may operate in an automatic mode, where system 100 further minimizes user interactions by automatically creating the AutoLoop output video without having a user specify the input video for creating an AutoLoop output video. Instead, in automatic mode, system 100 may autonomously select and/or determine whether system 100 is able to create an AutoLoop output video for a given input video using pregate and postgate operations.

FIG. 1 illustrates that system 100 may implement an AutoLoop pipeline that comprises obtaining an input video, performing pregate and preprocessing operations on the input video, stabilizing the input video, detecting loop parameters and baking out or creating, using loop parameters, the AutoLoop output video with crossfade, performing postgate analysis of the AutoLoop output video, and playing back the AutoLoop output video on a display device. Other embodiments of system 100 may have an AutoLoop pipeline that allows a user to select an input video and bypass performing pregate operations and/or postgate operations. Video stabilization can include a cascade of video stabilization operations including a tripod-direct mode, a tripod-sequential mode, and/or a sequential-smoothing mode. After stabilization, the system 100 may implement an AutoLoop operation to select and determine one or more optimal loop parameters. Once the loop parameters are determined, a crossfade may be added to smooth out any temporal and spatial discontinuities in the AutoLoop output video.

As shown in FIG. 1, system 100 includes an electronic device 105 that may represent a computer system that performs the AutoLoop pipeline. Electronic device 105 may be connected to other network devices across a network, such as mobile devices, tablet devices, desktop devices, as well as network storage devices such as servers and the like. In various embodiments, electronic device 105 may be a desktop computer, a laptop computer, a video-game console, an embedded device, a smart phone, tablet computer, personal digital assistant, portable music/video player, and/or any other electronic device that includes a camera system configured to obtain and process videos and images including series and/or sequences of images.

Electronic device 105 may include a camera 110, memory 115, sensors 135, central processing unit (CPU) 140, and data storage 145. Camera 110 may include an image sensor, a lens stack, and other components that may be used to capture images. In one or more embodiments, the camera may be part of the user device, such as the electronic device 105, and may be front-facing or rear facing such that the camera is able to capture images in front of a screen or behind the screen. Also illustrated in FIG. 1 is image sensors & analog-to-digital converter (S&A/D) 135 that may form part of camera 110. S&A/D 135 can include accelerometers, gyroscopes, or the like. S&A/D 135 may be configured to receive an analog signal representing an image, and to convert the received signal into digital image data that, in one embodiment, may be a series of individual blocks of digital image data representing an intensity of light that may be received through various photo-detectors of an image sensor and/or lens arrangement. S&A/D 135 may then provide the digital data to CPU 140 for processing.

Processor 140 may be a system-on-chip such as those found in mobile devices and include one or more dedicated graphics processing units (GPUs). Processor 140 may be configured to perform a variety of calculations on video and/or series of images that are obtained over a network or captured using camera 110. Processor 140 may be configured to control various operations of system 100 in response to computer-readable instructions that may be stored within one of the memory devices 115 or storage 145 of FIG. 1. Memory 115 and storage 145 may each include one or more different types of memory, which may be used for performing device functions in conjunction with processor 140. For example, memory 115 and storage 145 may include cache, Read-Only Memory (ROM), and/or Random-Access Memory (RAM). Memory 115 and storage 145 may store various processing engines for creating AutoLoop output video and implementing the AutoLoop pipeline. As shown in FIG. 1, the electronic device 105 may include a pregate and preprocessing engine 116, a stabilization engine 120, an AutoLoop core engine 125, a postgate engine 126, and an export/playback engine 130. In one embodiment, at least some of data and/or instructions stored in memory 115 and storage 145 may also be stored on another device of electronic device 105, including, but not limited to external device 150 such as CD-ROM/DVD-ROM, hard disk drive, or other computer-readable storage device resident on electronic device 105 or accessible by electronic device 105 over a network. Each engine 116, 120, 125, 126, and 130 may include one or more algorithms that provide a sequence of computing instructions executable by processor 140 to perform a variety of computing operations (e.g., operation 200 in FIG. 2) that process the input video or a series of images to generate the AutoLoop output video.

In one embodiment, for the electronic device 105 to automatically create an AutoLoop output video and minimize user interaction, the electronic device 105 may include a pregate and preprocessing engine 116. The pregate and preprocessing engine 116 may perform preprocessing operations that reduce a received input video and/or the number of images to an appropriate length. The input video and/or images may be captured, for example, by camera 110 or received by electronic device 105 from an external device 150 over a network from a server or other external devices (not shown). To perform preprocessing operations, the pregate and preprocessing engine 116 may identify one or more segments of the input video and/or multiple images that could be suitable for generating an AutoLoop output video. The AutoLoop output video is generally intended to be relatively short according to the processing time scales and the number frames. As such, the pregate and preprocessing engine 116 may trim or subsample longer inputs down to manageable lengths (e.g., several seconds). As part of the preprocessing operations, the pregate and preprocessing engine 116 may also check and verify that the shortened input captures appropriate content. Performing preprocessing operations are discussed in more detail in steps 206 and 210 of FIG. 2.

The pregate and preprocessing engine 116 may also perform pregate operations when operating in automatic mode. The electronic device 105 performs pregate operations to determine whether the content of the input video or multiple images are suitable for creating an AutoLoop output video. As opposed to a user-directed path (i.e., operating in a manual mode) in which a user requests to create an AutoLoop output video from a particular input, implementing an autonomous path (i.e., automatic mode) may initially include a determination whether or not to create an AutoLoop output video for a given input video. The pregate and preprocessing engine 116 may be configured to make a pass or fail decision and/or assign a pregate score using one or more image features. For example, the pregate and preprocessing engine 116 may implement a rule-based pregate classifier, such as a support vector machine (SVM), regression or regularized regression classifier, multilayer perceptron, and/or other classifier operation that are similar and trained from labeled data. If the pregate score exceeds one more pregate threshold values, the pregate and preprocessing engine 116 determine that the given input video is compatible with creating an AutoLoop output video.

To determine whether to automatically create an AutoLoop output video for a given input video and/or multiple images, the pregate and preprocessing engine 116 may analyze one or more image features for one or more frames within an input video. In one embodiment, the pregate and preprocessing engine 116 may analyze features based on results of a junk detector, a face detector, a scene classifier, and/or motion features. The junk detector may identify a variety of objects within one or more images that typically do not produce relatively high quality AutoLoop output videos. Examples of objects a junk detector may identify include receipts, whiteboards, notes, and other object content within an image used to record image information.

Additionally or alternatively, the pregate and preprocessing engine 116 may include a face detector that identifies one or more faces in an image and/or provide bounding boxes and other data related to face recognition. Generally, images that contain faces are less likely to produce relatively high quality AutoLoop output videos. In particular, the AutoLoop core engine 125 sometimes do not produce relatively high quality video loops for images containing faces since face motions may not be naturally periodic. Short loops containing faces can look repetitive and unnatural because humans do not typically move in this manner. In some instances, applying crossfade can cause ghosting that distorts faces in unappealing ways. To address some of these issues regarding faces, the AutoLoop core engine 125 performs operations to compensate for the non-periodic motions, for example, increasing the minimum loop period and reducing the crossfade length.

The pregate and preprocessing engine 116 may also implement a scene classifier and analyze motion features to determine whether an input video and/or multiple images are able to produce AutoLoop output videos. Scene classifiers may label images as containing particular objects or belonging to particular scene categories. The scene categories include, but are not limited to, outdoor and/or indoor environments, such as a beach, concert, waterfall, river, kitchen, and/or restaurants. Input video and/or multiple images that include outdoor and landscape scenery (e.g., waterfall, rivers, lakes, springs, fire, steam, tress, forests, and fields) are generally more compatible with producing AutoLoop output videos. In one embodiment, the scene classifier may be a raw scene classifier configured to analyze raw scene image representation that provide a lower-level raw image representation. The motion features may include a variety of motion data, such as motion data obtained from one or more sensors (e.g., a gyroscope). Motion data, such as optical flow magnitude, may also be used in determining whether to create an AutoLoop output video. For example, the pregate and preprocessing engine 116 may determine that objects within an input video that move very slightly may not produce an acceptable AutoLoop output video. The pregate and preprocessing engine 116 may determine whether objects move very slightly by determining the shift in pixels for the object and/or a pixel's color change (e.g., in quanta units) for a sequence of frames within the input video.

Stabilization engine 120 may be configured to perform video stabilization on the input video and/or multiple images. As shown in FIG. 1, the stabilization engine 120 may obtain the input video and/or multiple images from the pregate and preprocessing engine 116. Stabilization engine 120 may be configured to apply a cascade of stabilization operations on the input video to smooth out jitter, shaking, and/other unintended camera movements. As used herein, "cascade" may refer to iteratively applying one or more operations repeatedly to solve for a solution, or to applying several operations in order until a successful stabilization method or set of parameters is found. The cascade of stabilization operations may contain tripod-mode stabilization operations that include, but are not limited to, a sequential tripod-mode stabilization operation and/or a direct tripod-mode stabilization operation. The cascade of stabilization operations may also contain other stabilization operations, such as smooth-mode stabilization operations, if the tripod-mode stabilization operations are not successful in stabilizing the input video. Additionally or alternatively, the cascade of stabilization operations may include a pass-through mode that applies no stabilization operation if one or more stabilization operations fail. Performing video stabilization is discussed in more detail in FIG. 2.

FIG. 1 illustrates that the AutoLoop core engine 125 may be coupled to the stabilization engine 120. After receiving the stabilized input video, the AutoLoop core engine 125 may be configured to determine loop parameters from the stabilized input video. The AutoLoop core engine 125 may be configured to index the frames in the stabilized input video in order to determine an optimal starting frame 's', a loop period 'p' and, in embodiments, a crossfade length, 'w'. For example, the AutoLoop core engine 125 may be configured to determine loop parameters using a consensus AutoLoop operation or a per-pixel AutoLoop operation. A consensus AutoLoop operation minimizes a temporal energy function to select an optimized starting frame s and a loop period p, which may be defined in frames, to create an AutoLoop by playing frames 's' through 's+p−1' of the input video in a loop. The consensus AutoLoop operation may also add a temporal cross-fade to smooth any remaining temporal discontinuity. A per-pixel AutoLoop operation selects a different start time and period $(s_x; p_x)$ for each pixel x, with the goal of creating a temporally and spatially seamless loop, so that the resulting AutoLoop can contain many different loops, as well as static regions. The per-pixel AutoLoop operation could potential generate temporally smoother and more complex loops than the consensus AutoLoop operation. However, the consensus AutoLoop operation may be simpler, more robust, and more efficient than the per-pixel AutoLoop operation. Performing AutoLoop operations to determine loop parameters is discussed in more detail in step 225 of FIG. 2.

In one embodiment, the AutoLoop core engine 125 may add synthetic camera motion back into the AutoLoop output video to create a more handheld-based video. Once, the AutoLoop core engine 125 determines the loop parameters for the AutoLoop output video, the AutoLoop core engine 125 may compute a smooth looping version of the selected video loop by looping selected input frames multiple times and selecting a portion of the smooth synthetic camera loop as the synthetic camera motion (e.g. center smoothing segment). When computing the synthetic camera motion, the AutoLoop core engine 125 smooths the camera trajectory for frames taken from the input video and/or image that correspond to the selected frames in the AutoLoop output video. This stabilization process produces a smooth synthetic camera loop without first being stabilized using a tripod-mode stabilization operation. The synthetic camera motion loop includes some amount of camera motion to produce a more organic feel, but without the shaking or jerkiness caused from unintended camera movements. Afterwards, the AutoLoop core engine 125 may add the synthetic camera motion (e.g., center smoothing segment) back into the AutoLoop output video by applying the appropriate homographies. Adding synthetic camera motion to an AutoLoop output video may improve the ability to mask objectionable ghosting artifacts and potentially reduce stabilization warping artifacts by creating a smoothed version of the AutoLoop output video. Typically, implementing synthetic camera motion may require less warping than implementing tripod stabilization.

Once the AutoLoop core engine 125 determines the loop parameters, a postgate engine 126 may determine whether an AutoLoop output video based on the loop parameters produces a relatively high quality video loop. Although an AutoLoop core engine 125 may generate loop parameters that produce an AutoLoop output video that properly closes and loops, the AutoLoop output video may not contain enough motion for a user to detect or be of interest to a user. For example, the AutoLoop output video generated from the AutoLoop core engine 125 may contain mostly a static sequence with little movement in the video loop. To determine the quality of the AutoLoop output video, the postgate engine 126 may analyze one or more dynamism parameters for each pixel in the AutoLoop output video. If the postgate engine 126 determines that based on the dynamism parameters the AutoLoop output video is a relatively low quality AutoLoop and/or not a relatively high quality AutoLoop, the postgate engine 126 may automatically discard and reject the AutoLoop output video, notify a user of discarding or rejection the AutoLoop output video and/or prompt a user that the AutoLoop output video does not meet a quality threshold and inquire whether the user chooses to discard the AutoLoop output video.

The postgate engine 126 may determine the relative quality of the AutoLoop output video by analyzing dynamism parameters that are based on variability and dynamic range for each pixel of the AutoLoop output video. In one or more embodiments, the postgate engine 126 may analyze the variability and the dynamic range based on luminance and/or color intensity for each pixel. If the dynamism parameters exceed one or more postgate thresholds, then the postgate engine 126 may determine that the AutoLoop output video produces a relatively high quality video loop. The postgate thresholds may be configured to account for the intensity values for each pixel and/or the size of one or more continuous regions of pixels with the related intensity values. For example, the post gate engine 126 may determine that an AutoLoop output video satisfies the postgate thresholds when the AutoLoop output video includes a relatively small continuous region with relatively high intensity or having a relatively large continuous region with relatively low intensity.

Export and playback engine 130 may be coupled to the postgate engine 126 and configured to create a playback version of the AutoLoop output video based on operations of the AutoLoop core engine 125. In embodiments where the AutoLoop core engine 125 creates the AutoLoop output video using consensus AutoLoop operations, the export and playback engine 130 may be configured to create the AutoLoop output video as a short video and played back in a loop, or as an animated Graphics Interchange Format (GIF) or Portable Network Graphics (PNG) files. For a per-pixel based AutoLoop output video, the export and playback engine 130 may be configured to save the AutoLoop output video in a format for export to a custom media player for playing the video and apply various effects, such as blending.

Figure 2:
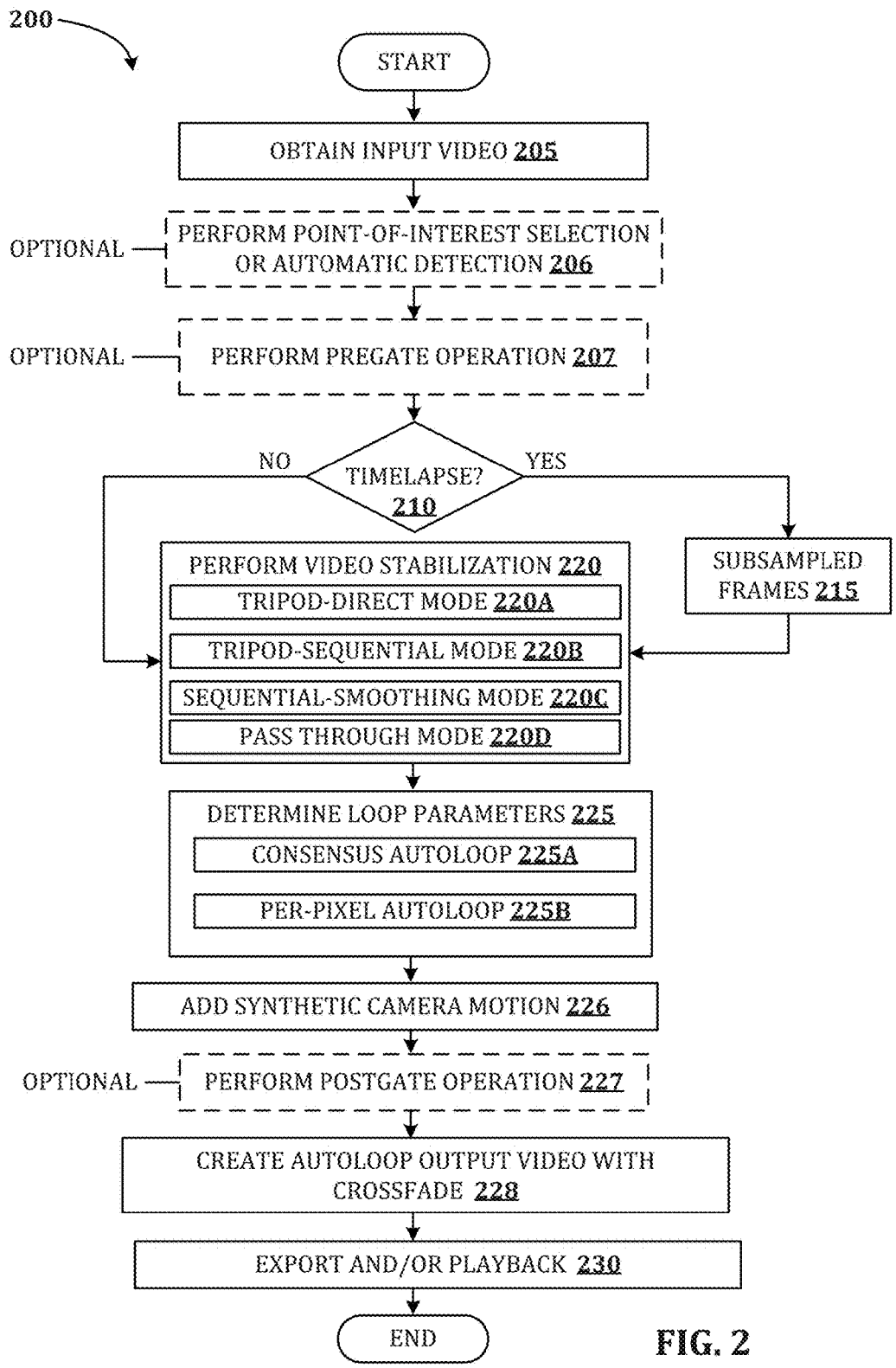
FIG. 2 depicts a flowchart illustrating a method for an AutoLoop operation in accordance with one embodiment.

FIG. 2 is flowchart of an embodiment of an operation 200 that depicts an AutoLoop pipeline for creating an AutoLoop output video. In one embodiment, operation 200 may be implemented within electronic device 105 as illustrated in FIG. 1. With continued reference to FIG. 1, operation 200 begins when electronic device 105 obtains an input video and/or multiple images (e.g., a series and/or sequence of images), collectively referred to as an "input video" at step 205. In embodiments, an input video may be captured, for example, by camera 110 or may be received by electronic device 105 from an external device 150 over a network. The input video can include short burst video clips of about 1 to 5 seconds, longer video clips from about 6 seconds to 60 seconds or more, burst sequences, frame sequences, slow motion video clips, or time-lapse videos. The input video can includes values at pixels over a time range and can be denoted as a three-dimensional volume (3D) volume $V(x, t)$ with a two-dimensional (2D) pixel location x,y and frame time t. The 2D pixel location may also be referred to herein as pixel x.

Next, operation 200 may move to optional step 206 and perform point-of-interest selection or automatic detection. Using FIG. 1 as an example, the pregate and preprocessing engine 116 may perform optional step 206. Operation 200 may perform optional step 206 when operation 200 determines that the input video is too long to pass directly through the AutoLoop pipeline. To determine whether an input video is too long, operation 200 may include one or more trimming thresholds indicative of when an input video is categorized as being too long. For example, if the length of the input video exceeds at least one of the trimming thresholds, operation 200 may determine the input video is too long to process for the AutoLoop pipeline. Operation 200 typically implements optional step 206 when the input videos is more than several seconds long (e.g., more than 6 seconds long). Once operation 200 determines that the input video is too long, operation 200 may trim down the input video.

To trim down the input video, operation 200 may manually identify one or more points-of-interest within the input video. Based on the identified points-of-interest, operation 200 may trim out a portion of the input video that contains the points-of-interest. In embodiments where operation 200 obtains the points-of-interest manually, a user may provide input data indicating the points-of-interest. For instance, a user may manually indicate the points-of-interest within the obtained input video with one or more input interface devices. Using FIG. 1 as an example, the electronic device 105 may include one or more input interface devices, such as keyboard, mouse, one or more buttons, and/or touchscreen that receives input data from a user that indicates the points-of-interest for an input video.

In another embodiment, operation 200 may automatically identify a point-of-interest using one or more image features associated with the clip, such as dynamism, optical flow analysis, face or human detection, motion tracking, and various other saliency measure. Additionally or alternatively, operation 200 may automatically identify a point-of-interest and/or a portion of video that includes the point-of-interest by performing stabilization trimming. Stabilization trimming selects one or more sub-segments that can be stabilized within the input video by performing a stabilization analysis of at least a portion of the input video. The stabilization analysis identifies images that are capable of being stabilized using one of the stabilization operations (e.g., a tripod-mode stabilization operation) and/or images with too much camera motion that exceed one or more motion thresholds. Portions of the input video that can be stabilized may be identified as video portions that include the point-of-interest while images with too much motion may be trimmed off.

After completing optional step 206, operation 200 may then move to optional step 207 and perform pregate operations. In FIG. 1, the pregate and preprocessing engine 116 may perform optional step 207. Operation 200 may bypass and not perform optional step 207 in situations where a user has manually requested and/or identified a point-of-interest and/or a portion of the input video to generate an AutoLoop output video. In instances where operation 200 does not receive a user request to generate an AutoLoop output video, operation 200 move to optional step 207 to automatically determine whether the content of the input video are suitable for creating an AutoLoop output video. Operation 200 may implement a pass and/or fail decision and/or assign one or more pregate scores using one or more image features. Examples of implementing operation 200 may include a rule-based pregate classifier, such as a support vector machine (SVM), regression or regularized regression classifier, multilayer perceptron, and/or other classifier operation that are similar and trained from labeled data. If the pregate score exceeds one more pregate threshold values, operation 200 may determine that the given input video is compatible with creating an AutoLoop output video.

At optional step 207, operation 200 may analyze one or more image features for one or more frames within an input video to score the compatibility of generating an AutoLoop output video using the input video. Operation 200 may analyze image features and produce pregate scores using one or more detectors and/or classifiers that include, but are not limited to a junk detector, a face detector, a scene classifier, and/or motion features. The junk detector may identify a variety objects within one or more images that typically do not produce relatively high quality AutoLoop output videos. A face detector identifies one or more faces in an image and/or provide bounding boxes and other data related to face recognition. Generally, images that contain faces are less likely to produce relatively high quality AutoLoop output videos and/or may require different loop optimization approaches, such as increasing the minimum loop period and reducing the crossfade length. Scene classifiers may label images as containing particular objects or belonging to particular scene categories. The scene categories may include, but are not limited to, outdoor and/or indoor environments, such as a beach, concert, waterfall, river, kitchen, and/or restaurants. In one embodiment, the scene classifier may be a raw scene classifier configured to analyze raw scene image representation that provide a lower-level raw image representation. The motion features may include a variety of motion data, such as motion data obtained from one or more sensors (e.g., a gyroscope). Motion data, such as optical flow magnitude, may also be used in determining whether to create an AutoLoop output video.

Next, operation 200 may determine whether to implement a timelapse conversion for all or part of the input video at step 210. Operation 200 may determine to implement a timelapse conversion based on a variety of conditions that include but are not limited to when the input video is still too long after the trimming and point-of-interest selection process (e.g., more than 6 seconds long) and/or the scene content within the input video. In embodiments where operation 200 performs timelapse conversion operations after performing video stabilization, operation 200 may consider whether to perform a timelapse conversion based on operation 200's ability to stabilize the input video using tripod-mode stabilization operations. If operation 200 determines to implement a timelapse conversion, operation 200 may move to step 215. Alternatively, if operation 200 determines not to implement a timelapse conversion, operation 200 may move to step 220. To perform a timelapse, operation 200 may move to step 215 and subsample the frames and subsequently play the frames at a higher frame rate. For example, operation 200 may initially have about a 60 second video at 30 frames per second (fps). To generate about a 5 second AutoLoop, operation 200 may compress the input video using a necessary factor of about 12 by subsampling frames from the input vide at 2.5 fps to get 150 frames in about 60 seconds. Afterwards, operation 200 may play the subsampled frames at 30 fps to get a 5 second time lapse.

At step 220, operation 200 may perform video stabilization on the frames in the input video using one or more video stabilization operations. With reference to FIG. 1, the stabilization engine 120 may perform step 220 of operation 200. Generating an AutoLoop output video typically involves stable input videos with minimal drift since the loop and crossfade aspects of the AutoLoop output video force direct visual comparisons between formerly temporally distant frames. If these frames have become dissimilar due to stabilization drift, comparing or blending them in the AutoLoop output video may cause visually jarring artifacts like temporal glitches or ghosting. Operation 200 may perform video stabilization at step 220 to stabilize the input video to look as though it had been shot using a tripod or shot with a smooth camera trajectory. The benefits of video stabilization include reducing or eliminating stabilization drift within the frames, which reduces artifacts in the AutoLoop output video, such as temporal glitches or ghosting.

In order to create a closed loop of video without a perceived seam or jump at the closure point, the content of the video is identically positioned across the loop closure. Most consumer videos are shot without the use of a tripod or other stabilization hardware, which typically results in video with camera shake and drift despite a user's attempts to keep the camera motionless. Camera shake and drift can create difficulty in finding candidate frames for loop closure points, as it may be unlikely that there will be two suitable frames or series of frames in which the content's position within the frame matches precisely, even if the subject of the video is motionless within the scene. Operation 200 may perform video stabilization of the raw input video to simplify the process of finding smooth loop closures and preserving motionless content as static as possible within the frame.

Operation 200 may implement a cascade of stabilization operations to stabilize the input video received from step 205 or after performing preprocessing and pregate operations at steps 206, 207, and 210. As shown in FIG. 2, operation 200 may attempt to stabilize the input video by initially implementing tripod-mode stabilization operations, such as a tripod-direct mode stabilization operation at step 220A or a tripod-sequential mode stabilization operation at step 220B. Other stabilization operations may also be used to stabilize the input sequence if none of the tripod-mode stabilization operations are successful in stabilizing the video. In FIG. 2, operation 200 may attempt to perform sequential-smoothing mode stabilization at step 220C if both the tripod-direct mode stabilization operation at step 220A and the tripod-sequential mode stabilization operation at step 220B fail. If sequential-smoothing mode stabilization fails, then operation 200 may not perform any stabilization operation using the pass through mode at step 220D. Operation 200 may use a variety of stabilization metrics to determine whether each form of stabilization succeeds including detecting and matching features between frames, feature match confidences, area occupied by matchable features, corner travel distance, corner angle deflection, and/or crop dimensions.

When performing stabilization operations, operation 200 may detect feature points in video frames of the input video. Feature points can include corners of objects that may be determined for each frame in the input video. For example, a reference frame may be selected from the input video frames (generally, but not necessarily, the middle frame) and operation 200 may determine one or more feature points in the reference frame. Operation 200 may also determine feature points across the video frames and the feature points may be matched across video frames to determine aligned features. Further, operation 200 may selectively align similar features across video frames. Operation 200 may determine a transformation to map the features from the frames in the input video. Once the transformation is found, the frame can be warped accordingly (warp the coordinates of the remaining frames to the reference frame), so that it is aligned with the reference frame. In some embodiments, based on the above transformation, a hardware-based warping mechanism may be used to transform the frame(s) onto the reference frame's coordinates. All other frames may be warped to match the coordinate system of the reference frame to create a stabilized input video.

In an embodiment, at step 220A, a tripod-direct mode stabilization operation may be applied to the input video. As shown in FIG. 3B, in tripod-direct video stabilization operation, frames of the input video may be matched directly to a single reference frame. After matching, a single correction homography may be found for each frame to map it directly to the reference frame. In tripod-direct mode operation, image features are initially detected in the reference frame $F_r$, which can typically be the temporal midpoint of the video sequence to reduce the maximum temporal distance between frames and the reference frame. Selecting the reference frame $F_r$ as the temporal midpoint helps to increase similarity between frames and the reference frame $F_r$; and thus, increase opportunities for feature matching. Then for each frame $F_i$ in the input video sequence, feature matching may be performed between $F_i$ and $F_r$, and a weighted random sample consensus (RANSAC) method analysis may be used to directly generate the correction homography matrix $M_r$, i to map the content of frame $F_i$ to $F_r$. Other analysis methods similar to RANSAC may also be used in other embodiments. A history of all matched features, including a history inlier/outlier status and reprojection error may be determined and stored. These feature histories can be used in the weighted RANSAC stage to ensure that tracking of content material in the video is consistent.

In tripod-direct stabilization formulation, equation 1 may be replaced with the correction homography matrix $M_{r,i}$ that maps frame F directly to the reference frame $F_r$, as shown in equation 1:

$$F_r = M_{r,i} F_i \qquad (1)$$

By performing a reprojection of each frame $F_i$ in the sequence by its corresponding correction matrix $M_{r,i}$, a stabilized video clip can be produced where the still content appears motionless. While there may be some motion artifacts and errors such as, parallax, non-planar motion, and feature location and reprojection errors, operation 200 may eliminate or reduce drift introduced by the cumulative effect of these errors in the tripod-sequential implementation. The reduction or elimination of drift ensures that most static content features essentially stay at a fixed pixel position throughout the stabilized clip. This allows for any two pairs of frames to be candidate loop closures for the static (i.e., stationary background) regions of the frame; thereby, greatly increasing the ability to find potential smooth loop closures throughout the input video.

In another embodiment, at step 220B, a tripod-sequential mode stabilization operation may be applied to the input video, which compares content between consecutive frames. Tripod-sequential mode stabilization operation may be configured to eliminate camera motion from the content by performing motion analysis between consecutive frames, and then mapping the frames back to a single reference frame (e.g., typically the middle frame) by chaining the homographies between intervening frames. For example, in the analysis phase, as shown in FIG. 3A, for each adjacent pair of frames $F_n$, $F_{n+1}$ in the video clip, a homography $H_n$ maps the planar motion of the content of frame $F_n$ to $F_{n+1}$. The correction matrix $M_{j,k}$ that maps frame $F_k$ to $F_j$ (i.e., $F_j = M_{j,k} F_k$) is then given by equation 2:

$$M_{j,k} = \Pi_{i=j}^{k-1} (H_i)^{-1} \qquad (2)$$

Where j<k.

If, for example, frame 0 is chosen as the reference frame, then by re-projecting each video frame $F_i$ in the sequence by the correction matrix $M_{o,i}$, a new video sequence can be produced where the motion of the tracked content is removed. As the analysis stage of the video only compares consecutive frames for relative motion, there may be a slight drift from frame to frame because of many factors, including error in accuracy of feature detection, margin of error in inlier detection of features, and non-planar motion of content. This drift may be typically imperceptible or inoffensive when viewing the resulting stabilized video, but a comparison of temporally distant frames will often show significant accumulated differences in the framing and reprojection of the video's content because of this drift. Thus, content within the video that is perceived as being static and motionless will in fact exhibit different pixel position within the frame over time, making smooth loop closure difficult, even for perceptually static elements.

With certain input videos, such as panning videos, operation 200 may find difficult to stabilize the input video using tripod-mode stabilization operations even though the video content may lend itself to creating a video loop. For example, a panning video of a person riding a bicycle in front of a featureless background may be a candidate for a video loop although performing tripod-mode stabilization operations may be difficult. In such cases, operation 200 may perform tripod-mode video stabilization operations on the input video and subsequently detect that tripod-mode stabilization has failed. When failure occurs, operation 200 may fall back to smoothing the input video path, such as performing sequential-smoothing mode stabilization operations shown in step 220C, to generate a stabilized video whose trajectory is similar to that of the input video (panning, for example), but with the high-frequency camera shake removed.

In addition, in embodiments, operation 200 may report to the user that stabilization of the input video using any of the stabilization operations in step 220 are not possible. Videos that cannot be stabilized include video with severe shake and/or panning, or videos where there are no detectible features in the content, for example, running water or clouds. Video input content that include no detectible features, such running water or clouds, may still be used to create an AutoLoop output video without stabilization. Content with these type of features are often forgiving for looping purposes even without stabilization because there are no features to mismatch and crossfading may smooth the temporal discontinuity without causing much ghosting.

At step 220, operation 200 may also be able to improve stabilization by dropping frames with too much shaking or motion at the beginning or end of the input video. For example, for a given input video, the initial frames may suffer from severe shaking or movement initially, but subsequently become fairly still. Having operation 200 drop the initial bad frames allows operation 200 to stabilize the input video using one of the stabilization operations, such as a the tripod-sequential mode stabilization operation. Not dropping the initial bad frames could prevent operation 200 in stabilizing the input video. Stabilization success metrics, such as quality of matched features, corner behavior, and crop dimensions may be used to determine how many frames to drop from the beginning and end of the input video.

After performing video stabilization, operation 200 may then move to step 225 and determine loop parameters. In FIG. 1, the AutoLoop core engine 125 may perform step 225 of FIG. 2. In an example, operation 200 may index the frames in the input video from 1 to N in order to determine a starting frame 's', a loop period 'p' and crossfade length, 'w', using one or more AutoLoop operations. Loop parameters may be determined using a consensus AutoLoop operation or a per-pixel AutoLoop operation.

In one embodiment, operation 200 may use the consensus AutoLoop operation in step 225A to determine loop parameters. The consensus AutoLoop operation may minimize a temporal energy function to select the starting frame s, and loop period (in frames) p, to create an AutoLoop output video, with a temporal cross-fade added to smooth any remaining temporal discontinuity. For the consensus AutoLoop operation, loop playback options include a short video from the selected frames with an appropriate crossfade in an embodiment and played back in a loop, or created as an animated GIF or PNG file. The consensus AutoLoop operation may be simple, robust, and computational efficient.

Figure 4A:
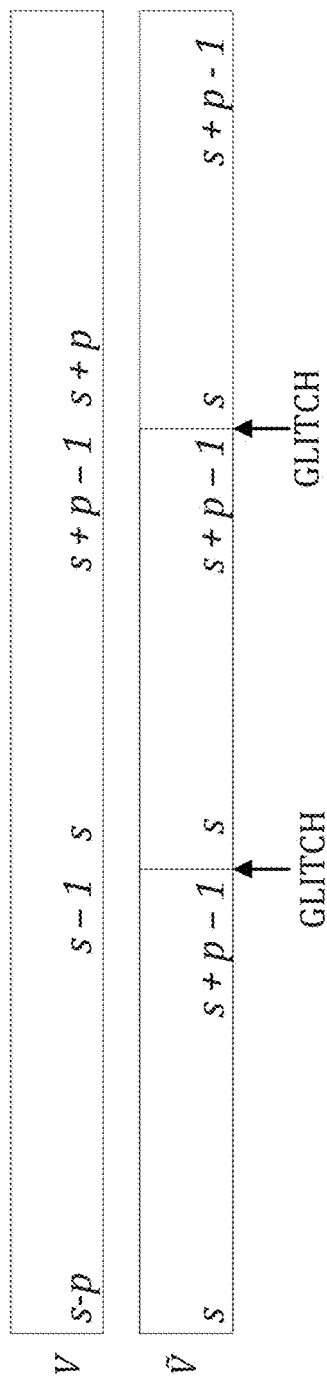
FIG. 4A illustrates a diagram used to determine loop parameters and loop period using a consensus AutoLoop operation without crossfade in accordance with one embodiment.

For the consensus AutoLoop output video operation, a starting frame, s and loop period (in frames) p, may be selected from the stabilized video to create an AutoLoop output video by looping frames s through s+p−1 of the stabilized video, as shown in FIG. 4A. That is, if V(t) denotes frame 't' of the input video, for 0≤t<N (where N is the number of frames), then the output video loop is given by $\tilde{V}$ in equation 3, where $$\tilde{V}(s+t)=V(s+\mathrm{mod}(t,p)), \text{ for all } -s\le t<\infty \quad (3)$$

For notational convenience, let $\phi_p(t)=\mathrm{mod}(t,p)$, so equation 3 becomes:

$$\tilde{V}(s+t)=V(s+\phi_p(t))$$

Hence, V(s+t)=V(s+t) for 0≤t<p, and V(t+ξp)=$\tilde{V}$(t) for integers ξ (with 0≤t+ξp≤N). $\tilde{V}$ simply picks out frames s through s+p−1 of the input V and plays them in a loop. In this formulation, $\tilde{V}$ starts with frame s+mod(−s, p) of the input, rather than frame s.

Additionally, the consensus AutoLoop output video operation may require that 0≤s<N, 1<$p_{min}$≤p≤N, and s+p<N. In one embodiment, the period p may be greater than one frame since p=1 corresponds to a static scene and short loops often look jerky and repetitive. One second may be the minimum loop length that consistently produces a relatively high quality video loop over a wide range of content, so setting a lower bound $p_{min}$ equal to about one second gives a loop that is at least one second long, that is, $p_{min}$=1.0× frame rate (e.g., $p_{min}$=30 for a 30 fps video).

Based on these constraints, operation 200 may select a start time s and period p to create a loop for the video that represents a loop with minimal temporal discontinuity in the transition from the end of one loop to the beginning of the next, (i.e., the transition from frame V(s+p−1)→V(s)). For a smooth and natural-looking transition, this may be as similar as possible to the transition from V(s+p−1)→V(s+p) in the input video. Therefore, s and p may be chosen such that V(s)≈V(s+p), so that V(s+p−1)→V(s) looks similar to V(s+p−1)→V(s+p). This represents the minimization problem for an energy function shown in equation 4.

$$\min_{s,p} E_t(s,p) = \|V(s)-V(s+p)\| \quad (4)$$

where $\|V(t_1)-V(t_2)\|=\Sigma_x \|V(t_{1,x})-V(t_{2,x})\|$
V(t,x) denotes pixel x at frame t, represented as a vector with one entry for each color channel (e.g., Y, Cb, and Cr for YCbCr color representation and R, G and B for RGB color representation). The pixel difference, $\|V(t_{1,x})-V(t_{2,x})\|$, may include perceptual channel weights, for example, for YCbCr, the Y plane may be weighted more heavily that the CbCr plane since it is more perceptually significant. In other words, as shown in equation 4, minimization of the energy function is based on the difference of pixels, where each pixel has different color channels that could be weighted differently. Operation 200 obtains a sum over of the perceptual pixel difference for all of the pixels between two frames, $t_1$ and $t_2$. By doing so, operation 200 is able to obtain a perceptual measure between the two frames, $t_1$ and $t_2$. For a symmetric formulation, the energy function could also encourage V(s−1)≈V(s+p−1) so that V(s+p−1)→V(s) looks similar to V(s−1)→V(s), as well as to V(s+p−1)→V(s+p). The energy function, as shown in equation 5 would then become:

$$E_t(s,p) = \frac{1}{2}\|V(s)-V(s+p)\|^2 + \frac{1}{2}\|V(s-1)-V(s+p-1)\|^2 \quad (5)$$

In an embodiment, the consensus AutoLoop operation may include a crossfade and optimize loop parameters with respect to the crossfade. Even minimal temporal discontinuity in AutoLoop output videos can be perceptible in output videos without a crossfade and appear as a jarring temporal 'glitch' during playback as shown in FIG. 4A. The minimization of energy function in equation 4 compares frames s and s+p and ignores the frames that follow, even if the input video diverges dramatically from the loop shortly after the loop restarts. For example, in an input video that includes a pendulum swinging back and forth, a loop with the pendulum weight at the same location but moving in opposite directions at frames s when compared to s+p would receive a low energy function. As a result, frames at s+t and s+p+t would rapidly diverge when t is greater than zero.

Figure 4B:
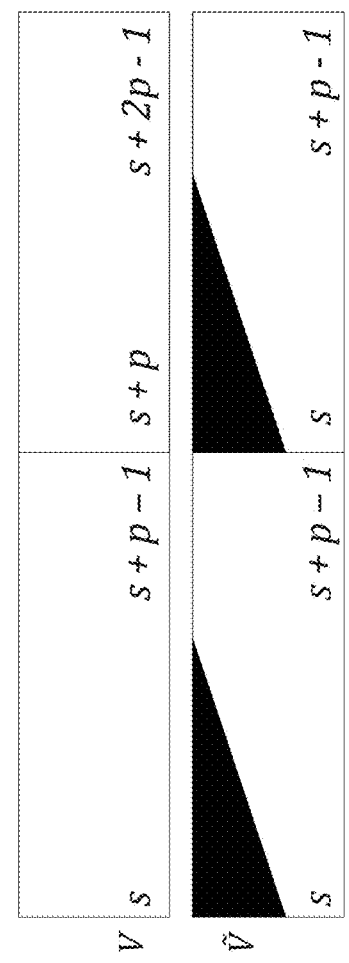
FIG. 4B illustrates a diagram used to determine loop parameters and loop period using a consensus AutoLoop operation in accordance with one embodiment.

To mitigate temporal discontinuity, a temporal crossfade may be performed to gradually fade the beginning of the loop into the frames that follow it, as shown in FIG. 4B. Crossfade may determine one or more frames after the loop period. These post-loop frames may be used to blend with frames at the beginning of the loop. Crossfade is a common cinematic technique to account for discontinuity in a loop, but it can cause ghosting, when rigid objects fade in and out. However, viewers may typically be accustomed to this kind of artifact, is less visually objectionable than a temporal glitch shown in FIG. 4A. In addition to masking technical imperfections, crossfading can also often add an artistic effect to video loops.

Given a crossfade length 'w', with 0≤w≤p, an output loop with fade may be defined by equation 6:

$$\tilde{V}(s+t) = \begin{cases} \alpha_{\varphi_p(t)}V(s+\varphi_p(t)) + (1-\alpha\varphi_p(t))V(s+p+\varphi_p(t)), & \\ \quad \text{for } 0 \le \varphi_p(t) < w \\ V(s+\varphi_p(t)), \text{ for } w \le \varphi_p(t) < p \end{cases} \quad (6)$$

The crossfade is asymmetric and may be built with frames following the loop rather than preceding the loop. By doing so, operation 200 is able to select any s≥0 since the fade buffer is at the end of the video. For a linear fade, the weight 'α' is given by equation 7:

$$\alpha_t = \frac{t+1}{w+1}, \text{ for } 0 \le t < w \quad (7)$$

That is, for 0≤t≤w:

$$\tilde{V}(s+t) = \alpha_t V(s+t) + (1-\alpha_t)V(s+p+t), \text{ with } \alpha_t = \frac{t+1}{w+1} \quad (8)$$

Note that with w=0, equation 8 reduces to looping without crossfade as shown below in equation 9:

$$\tilde{V}(s+t)=V(s+\varphi_p(t)), \text{ for } 0\le\varphi_p(t)<p, \quad (9)$$

For w=p, equation 9 becomes equation 10 as shown below:

$$\tilde{V}(s+t)=\alpha_{\varphi_p(t)}V(s+\varphi_p(t))+(1-\alpha_{\varphi_p(t)})V(s+p+\varphi_p(t)), \alpha=(t+1)/(p+1) \quad (10)$$

To account for the crossfade, a temporal energy function may penalize the difference between the crossfaded loop and the corresponding segment of the input video. For nontrivial fades, i.e. w>0, the minimization problem may be defined in equation 11 as:

$$\min_{s,p} E_t(s, p, w) = \sum_{t=0}^{w-1} \Psi_t, \text{ for } 0 < w \le p \quad (11)$$

$$\text{where } \Psi_t = \|\tilde{V}(s+t) - V(s+t)\|^2$$

The temporal energy function simplifies to equation (12):

$$E_t(s, p, w) = \sum_{t=0}^{w-1} \Psi_t = \sum_{t=0}^{w-1} \|\tilde{V}(s+t) - V(s+t)\|^2 = \sum_{t=0}^{w-1}(1-\alpha_t)^2 \Delta V_s, \quad (12)$$

$$p(t), \Delta V_s, p(t) = \|V(s+t) - V(s+p+t)\|^2$$

The energy formulation above reduces the weight on the frame difference proportional to the position in the fade, but this sometimes insufficiently penalizes ghosting artifacts occurring near the end of the fade, which can be just as noticeable even though they are faint. Equation 13 is an alternative to the above temporal energy function that has uniform weights:

$$E_t^{uniform}(s, p, w) = \sum_{t=0}^{w-1} \|V(s+t) - V(s+p+t)\|, \quad (13)$$

$$\text{for } 0 < w \le p, \quad = \sum_{t=0}^{w-1} \Delta V_{s,p}(t)$$

This penalizes the difference between the fade inputs equally for the entire duration of the fade. Equation 13 can help reduce ghosting in situations where ghosting occurs toward the end of the fade, where there is significant divergence between V(s+t) and V(s+p+t) fort close to w, but is not heavily penalized since the a value is relatively small.

In another embodiment, operation 200 can refine the frame difference measures used in the temporal energy function in several ways by weighting the individual pixels proportional to their impact on the perceptual quality loop. Equation 14 provided below implement the pixel difference weighting:

$$\|V(t_1) - V(t_2)\|^2 = \Sigma_{x \in V} \gamma(x, t_1 : t_2) \|V(t_{1,x}) - V(t_{2,x})\| \quad (14)$$

Where γ(x, $t_1$:$t_2$) weights pixel x and can potentially depend on the frame range $t_1$:$t_2$. Operation 200 may let the weight γ depend inversely on the temporal variability of the pixel and possibly the variance of the differenced signal since loop closure differences may be less noticeable for pixels that are highly variable within the loop. Operation 200 may also let γ depend inversely on the spatial variability in a neighborhood of the pixel, since loop closure discrepancies might also be masked by high spatial variability. Finally, the presence or absence of edges (e.g. run Harris corner/edge detector to generate edge map) could inform the pixel weight. Down weighting pixels on or near edges may also be appropriate, since minor stabilization errors can cause edges to move very slightly, which creates very large differences in the pixels near the edge. Adding appropriate pixel weights could help normalize the energy function across different content classes (e.g., videos with relatively little motions versus highly dynamic videos). The pixel weighting operation could also be relevant for designing metrics to help determine whether anything is happening in a particular portion of the input video.

For the consensus AutoLoop operation the fade length, either fixed or variable, may be determined after optimizing the loop period p. Any fixed fade length, w, may be chosen with 0≤w≤min(p, N−p−s−1) to ensure that enough frames remain after the loop to form the fade. At the extremes, w=0 means no fade, and w=p means all frames of the loop will be crossfaded. In an embodiment, a fixed fade length of approximately one second may be set, as this length may be long enough to smooth the temporal discontinuity and add an appealing effect. Additionally, a fixed fade length of approximately one second may be less than or equal to the minimum allowed p so that w<=p is always satisfied and short enough that reserving fade buffer frames at the end of the loop do not limit the available s and p too much. A long crossfade may generate an AutoLoop output video with a signature look and feel.

A fade width may also be selected that varies depending on the video content. This may be desirable, since too long a crossfade may cause ghosting for certain content, while some loops may have a severe discontinuity at the loop closure that requires a longer crossfade to smooth. To optimize the fade width w for a given s, p, an energy function $E_{fade}$ may be used that models the content-dependent quality of different fade lengths and solves equation 15:

$$\min_w E_{fade}(s, p, w) \quad (15)$$

The energy function may capture the discrepancy between the crossfaded and input frames over the duration of the fade, as well as other characteristics of the input content that affect the perceptibility and desirability of ghosting artifacts. In an embodiment, $E_{fade}$(s, p, w) may also be minimized over s, p, and w simultaneously. Operation 200 may also optimize a different fade width $w_x$ for each pixel x by solving equation 16:

$$\min_w E_{fade}(x, s, p, w) \quad (16)$$

A fade length that varies for each pixel may allow the fade to adapt to different types of content in different regions of a single video, to reduce ghosting in area where it is problematic, while achieving sufficient smoothing in other regions. After optimizing the fade length for each pixel, operation 200 may apply a Gaussian blur to the image formed by the fade lengths $w_x$ to smooth out the fades over all pixels. FIG. 2 also illustrates that operation 200 may determine loop parameters using per-pixel AutoLoop operations as shown in step 225B. The per-pixel AutoLoop operation may select a different start time and period (sx, px) for each pixel x for creating a temporally and spatially seamless loop, so that the resulting AutoLoop output video can contain many different loops in a single image, as well as static regions. Per-pixel AutoLoop operations may generate temporally smoother, more complex, and more interesting loops at a greater computational cost. The per-pixel AutoLoop operation may also discover lower temporal-energy loops, since different regions can choose different loops. For per-pixel-based AutoLoop output video, a custom media player may be required to play different loops for each pixel, and potentially apply various effects like blending.

The temporal energy function may be further modified to encourage longer loops by attenuating based on the length of the loop period, with a multiplicative term of the form C/(C+p), where C is a constant. This, the energy attenuation may be rewritten as shown in equation 17.

$$\tilde{E}_t(s, p, w) = (C/(C+p))E_t(s, p, w) = (C/(C+p))\sum_{t=0}^{w-1} \gamma_t \Delta V_{s,p}(t) \quad (17)$$

The temporal energy function may also be modified to encourage more dynamic loops, for instance by dividing the loop energy by the average frame-to-frame temporal variability for loop, which is shown below in equation 18.

$$v(s, p) = 1/p \sum_{s}^{s+p-1} \|V_{t+1} - V_t\|^2 \quad (18)$$

$$\tilde{E}_t(s, p, w) = 1/(w(s, p))E_t(s, p, w)$$

In another embodiment, operation 200 may use the per-pixel AutoLoop operation in step 225B to determine loop parameters. A per-pixel AutoLoop operation selects a different start time and period ($s_x$; $p_x$) for each pixel x, with the goal of creating a temporally and spatially seamless loop, so that the resulting AutoLoop can contain many different loops, as well as static regions. To implement per-pixel AutoLoop operations, the start time and period may be optimized according to equation 19.

$$E(s, p) = E_1(s + p) + BE_2(s, p) \quad (19)$$

Where $E1(s, p) = c_{static} 1_{p=1} E_{static} + 1_{p\neq 1} E_{temporal}(s, p)$, and $E_2(s, p) = E_{spatial}(s, p)$ $$E_{static} = \sum_{x|px=1} e_{static}(x)$$

$$E_{temporal(s,p)} = \sum_{x} e_t(x, s, p)\gamma_t(x)$$

$$E_{spatial(s,p)} = \sum_{\|x-z\|} \frac{1}{T}\sum_{t=0}^{T} e_x(x, z, s_x, p_x, s_z, p_z)\gamma_s(x, z)$$

Where, $E_{static}$ is the static energy, $E_{temporal}$ is the temporal energy, $E_{spatial}$ is the spatial energy. Static energy may be defined as the following in equation 20:

$$E_{static} = \Sigma_{x|px=1} e_{static}(x)$$

$$e_{static}(x) = \min\{staticCutoff, MAD\{g_{diff}(x)\}\} - staticShift \quad (20)$$

$g_{diff}(x, t) = \|G(x, t+1) - G(x, t)\|$, where G is a spatiotemporal Gaussian blur operator. Median Absolute Deviation (MAD) is a $l_1$ analog of variance. Therefore, MAD$\{g_{diff}(x)\}$ measures the variability of the differenced values of a given pixel through time (after a spatiotemporal blur has been applied to entire video). $E_{static}$ relative to a limited range of frames may also be computed, by updating equation 20 with MAD$\{g_{diff}(x, t1: t2)\}$.

Temporal energy is analogous to equation 11, which is the temporal energy to penalize the discrepancy between the crossfaded loop and input video; however, it is not defined on a per-pixel pixel basis. An optional attenuation term $\gamma t(x)$ may be included in the equation to generate equation 21.

$$E_{temporal(s,p)} = \sum_{x} e_t(x, s, p)\gamma_t(x)e_t(x, s, p) = \sum_{t=0}^{T_w-1} \Psi_t \quad (21)$$

$$\Psi_t(x) = \|\tilde{V}(s+t, x) - V(s+t, x)\|^2$$

Operation 200 may implement a two-stage approach for energy minimization via graph cut: Stage 1: For each candidate looping period p, optimize per-pixel start times $s_x$/p; Stage 2: Optimize per-pixel looping periods paired with optimal start times ($p_x$, $s_x$/$p_x$). Each stage may be formulated as a multilabel graph cut operation. An alpha-expansion operation using one or more graph construction known by persons of ordinary skill in the art may be implemented to minimize spatiotemporal energy functions in each stage of the algorithm. Alpha-expansion operations iteratively and approximately solves a multilabel minimization problem of the form by solving a sequence of binary graph cut problems, in which each variable can either keep its current label or adopt a new candidate label, α. Each binary graph cut problem can be solved by computing the minimum cut on a graph. In one embodiment, a Ford-Fulkerson style augmenting path operation may be used to compute the minimum cut on a binary graph. Other embodiments may use other types of graph cut solutions known by persons or ordinary skill in the art for energy minimization purposes.

Operation 200 may also perform a smooth up-sampling of the loop parameters when implementing per-pixel AutoLoop operations. The optimization may be performed on a down-sampled image and then the loop parameters may be smoothly up-sampled to apply to the full-resolution image. This can result in blocky up-sampling artifacts, which can be fixed by via Graph Cut or Gaussian blur. Multilabel graph cut may be used to find the optimal (s, p) label for each pixel in the upsampled image, from among the labels of its naively-upsampled neighbors. A Gaussian blur may be applied to the full-resolution 'images' of naively-upsampled s and p labels (represented in floating-point), then round each floating-point blurred s and p to the closest label belonging to one of its neighbors in the naively upsampled image.

Operation 200 may also perform segmentation on active and inactive regions when implementing per-pixel AutoLoop operations. Segmentation of the video into active (looping) and static (non-looping) regions before performing the loop parameter search can improve both performance and quality. The active-static segmentation can be formulated as a binary graph cut problem. The segmentation may allow freezing of the static pixels and loop parameter optimization may be performed only over active pixels which improves performance by decreasing the number of variables in the multilabel graph cut (i.e. pixels for which a nonstatic label maybe found). In addition, quality may be improved using consensus loop parameters and component content. For example, given an initial segmentation of the video into active vs. static pixels, the output frame may be divided into spatially disconnected components that encapsulate separate dynamic regions, which can operate independently in later stages of the algorithm. The consensus parameters may be separately searched for each segment, different treatments may be applied depending on component content (e.g. faces, objects), or each component may be evaluated individually a posteriori (and frozen it if needed).

In another embodiment, temporal crossfades and spatial blurs may be used to mask temporal and spatial glitches, respectively, in the output video. A per-pixel temporal crossfade of specified width (less than or equal to a pixel period), and spatial Gaussian blurs of a specified radius may be performed. A Laplacian pyramid-blending (multi-layer) may be used to hide spatial seams in an embodiment. Given N input images $I_0,..,I_{N-1} \in R^{npixels}$ (linearized representations of 2D images) and a mask $M \in Z^{npixels}$ with $M(x) \in \{0,..,N-1\}$ equal to the input image from which pixel x is drawn, it may be desired to generate a spatially blended version of the naive output image $\breve{I} \in R^{npixels}$ defined by equation 22:

$$\breve{I}(x) = I_{M(x)}(x) \tag{22}$$

Let $I \in R^{npixels}$ denote the final blended output image we wish to obtain by smoothing $\breve{I}$ via Laplacian pyramid blending. Define masks $M_0,..,M_{N-1} \in \{0,1\}^{npixels}$ by equation 23:

$$M_n(x) = 1\{M(x) = n\} \tag{23}$$

That is, each binary mask corresponds to a particular input image and indicates whether or not each pixel of $\breve{I}$ is drawn from that input image.

Let $G_0,..,G_{N-1}$ denote the (K+1)-level Gaussian pyramids of the binary masks $M_0,..,M_{K+1}$, respectively. Let $G_n(k, x)$ for $0 \leq n < N$, $0 \leq k \leq K$, denote the value of pixel x in the k-th level of the nth pyramid (noting that the range of x depends on the pyramid level as each level is down sampled by a factor of 2 in each dimension). Let $L_0,..,L_{N-1}$ denote the K-level Laplacian pyramids of the input images $I_0,..,I_{N-1}$, respectively. $L_n(k, x)$, $0 \leq n < N$, $0 \leq k < K$ again denotes the value of pixel x in the kth level of the nth pyramid (and again, the range of x varies since the levels are down sampled). A K-level blended Laplacian pyramid $L \in R_{K \times npixels}$ may be built. The desired output I can then be obtained by collapsing Laplacian pyramid L. Each level of L may be generated as shown in equation 24:

$$L(k, x) = \sum_{n=0}^{N-1} G_n(k, x) L_n(k, x), k = 0, \cdot, K-1. \tag{24}$$

Which has the properties: $L(0, \cdot) = \tilde{I}$, and $$\sum_{n=0}^{N-1} G_n(k, x) = 1, \text{ for all } 0 \leq k \leq K \text{ and all } x.$$

where $L(k, \bullet)$ is a weighted linear combination of the input Laplacian pyramids with weights summing to unity.

After determining the loop parameters in step 225, operation 200 may proceed to step 226 and add synthetic camera motion back into the AutoLoop output video. Adding synthetic camera motion back into the AutoLoop output video may not only create a more handheld-based video, but also improve the ability to mask objectionable ghosting artifacts and potentially reduce stabilization warping artifacts by creating a smoothed version of the AutoLoop output video. Once operation 200 determines the loop parameters for the AutoLoop output video, operation 200 may compute a smooth looping version of the input video for the frames that corresponds to the AutoLoop output video (e.g., frames s to s+p−1). In other words, the synthetic camera motion provides some amount of camera motion by smoothing out the camera trajectory of frames the input video that correspond to the AutoLoop output video (e.g., frames s to s+p−1). Afterwards, the synthetic camera motion may be added back into the AutoLoop output video by applying the appropriate homographies for the synthetic motion to the frames of the loop and crossfades.

Figure 5:
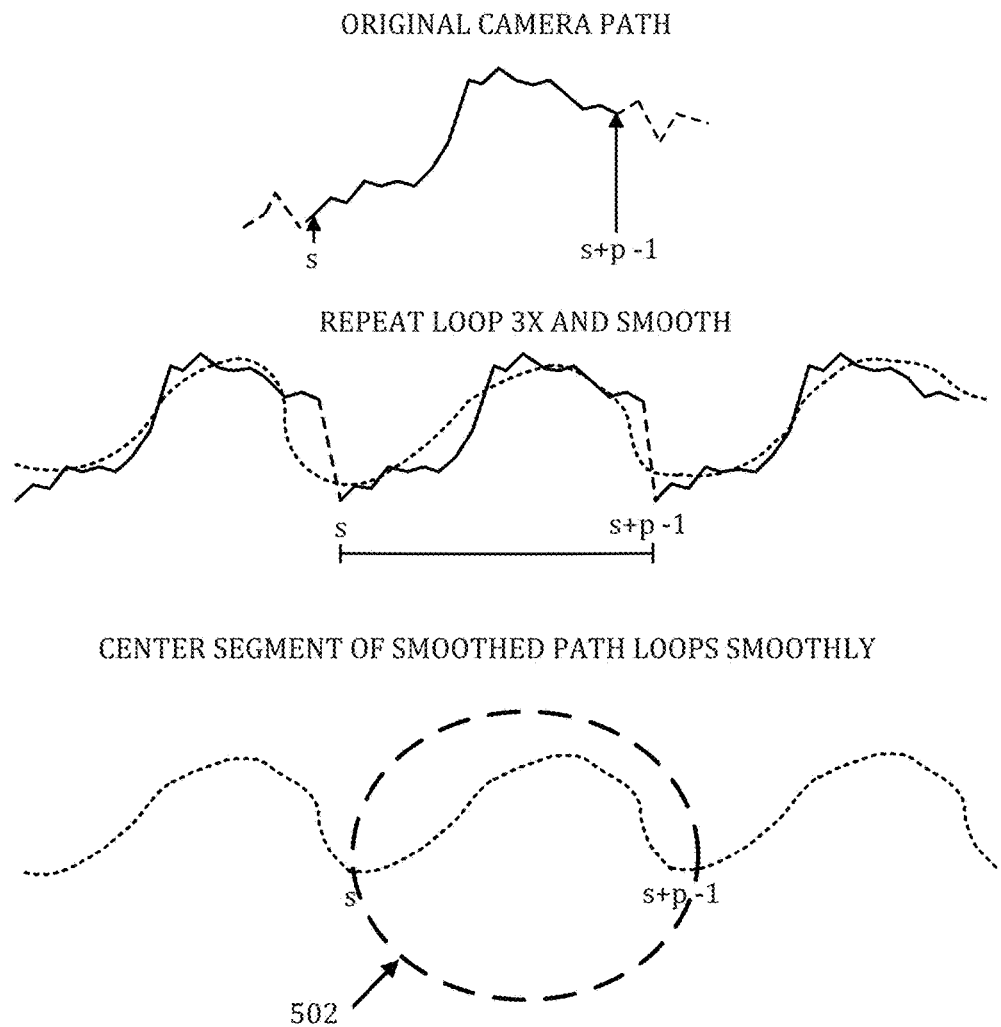
FIG. 5 illustrates a diagram used to smooth input video to produce synthetic camera motion in accordance with one embodiment.

FIG. 5 is an illustration of computing a synthetic camera motion based on the input video frames that match the AutoLoop frames determined in step 225. As shown in FIG. 5, the original camera path may include jagged and abrupt camera trajectories that could be caused from shaking and/or jerky camera movements within the input video. To compute the smooth looping synthetic camera motion using the original camera trajectories from the input video, the frames within the input video that correspond to the AutoLoop frames (e.g., frames s to s+p−1) may be repeated multiple times (e.g., at least three times). Operation 200 may then smooth out the camera trajectory with a Gaussian kernel, which may have a radius smaller than the loop period, and select a segment of the smooth path that corresponds to the center repetition of the loop. The center repetition loop is labeled as 502 within FIG. 5. By repeatedly looping the input video, smoothing out the camera trajectory, and choosing the center smoothed segment, operation 200 may ensure that the loop closes smoothly. Embodiments of the Gaussian kernel may be a fixed kernel radius or a kernel that adaptively varies its kernel width. When using a varying kernel width, the Gaussian kernel may be configured to use a wide kernel near the loop closure point to apply more smoothing and a narrower kernel away from the closure point. Other embodiments may vary kernel width based on the total amount of motion with the loop or based on random motion.

Operation 200 may then move to optional step 227 and perform postgate operations. Postgate operations may determine the relative quality of the AutoLoop output video by analyzing dynamism parameters that are based on variability and dynamic range for each pixel of the AutoLoop output video and/or parameters related pregate operations. In one or more embodiments, operation 200 may determine the variability and the dynamic range based on luminance and/or color intensity. Variability, which can be defined below using equation 25, represents the change of pixel intensity over time.

$$V(p_i) = \sqrt{\frac{\Sigma_t (d_i(t) - \bar{d}_i)^2}{T-1}} \tag{25}$$

$$d_i(t) = p_i(t+1) - p_i(t)$$

Where $p_i$ represents the pixel intensity (e.g., color or luminance) of a pixel i; t represents time, $d_i(t)$ represents the difference in pixel intensity between consecutive frames t and t+1; and T is the number of frames. Dynamic range, which can be defined below using equation 26, represents a maximum pixel intensity range over time for each pixel in the AutoLoop output video.

$$R'(p_i) = \min_{p_j \in neighborhood\ (p_i)} \left( \max_t (p_i(t)) - \min_t (p_i(t)) \right) \tag{27}$$

Where $$\max_t (p_i(t))$$

represents a maximum pixel intensity and $$\min_t (p_i(t))$$

represents a minimum pixel intensity for a given pixel. Neighborhood dynamic range, which can be defined below using equation 27, represents a dynamic range for a continuous region for a frame.

$$R(p_i) = \max_t(p_i(t)) - \min_t(p_i(t)) \quad (26)$$

Figure 6:
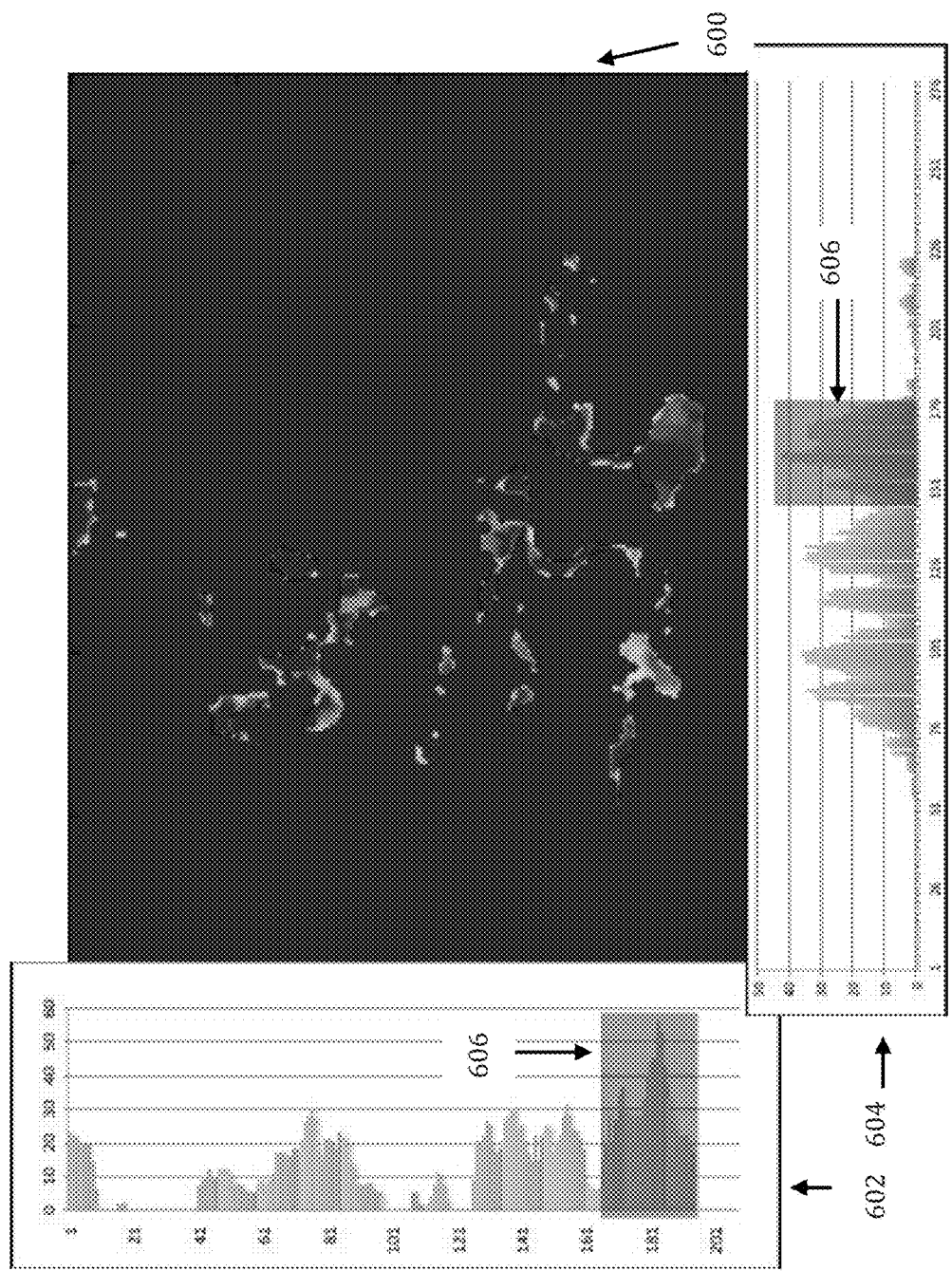
FIG. 6 illustrates a diagram used to perform postgate operations.

Operation 200 may use the variability and dynamic range for the pixels to compute one or more dynamism parameters and compare the dynamism parameters to one or more postgate threshold to determine whether the AutoLoop output video produces a relatively high quality video loop. The postgate thresholds may be configured to account for the intensity values for each pixel and the size of one or more continuous regions of pixels with the related intensity values. Operation 200 may then determine that an AutoLoop output video satisfies the postgate thresholds when the dynamism parameters, such an activity level threshold and area level threshold are above the postgate thresholds. Using FIG. 6 as an example, operation 200 may determine that an AutoLoop output video satisfies the postgate thresholds when the activity level threshold is above 40 pixel intensity units and the area level threshold of five percent. Image 600 corresponds to morphological closure that includes activity levels above 40. To determine whether the AutoLoop output video includes a continuous area above the activity level threshold, operation 200 may generate a row sums 602 and/or column sums 604 of pixel counts that are over the threshold. As shown in FIG. 6, based on the row sums 602 and column sums 604, the image includes an area 606 that includes at least 11 consecutive rows and column (i.e., more than 5% area level) somewhere in the image. Operation 200 when the AutoLoop output video includes a relatively small continuous region with relatively high intensity. Based on this postgate threshold, the AutoLoop output video would pass post gate operations. Operation 200 may also implement other post gate threshold that vary the activity level threshold and area level threshold.

After operation 200 finishes postgate operation 227, operation 200 may move to step 228 to create the AutoLoop output video with crossfade based on the loop parameters generated from step 225 and optionally the addition of synthetic camera motions at step 226. If operation 200 determines that based on the dynamism parameters the AutoLoop output video is a relatively low quality AutoLoop and/or not a relatively high quality AutoLoop, rather than moving to step 228, operation 200 may automatically discard and reject the AutoLoop output video, notify a user of discarding or rejection the AutoLoop output video and/or prompt a user that the AutoLoop output video does not meet a quality threshold and inquire whether the user chooses to discard the AutoLoop output video. Operation 200 may then move to step 230 to export and/or playback the AutoLoop output video. Export and/or playback of the AutoLoop output video may be based on the AutoLoop operation used to determine loop parameters. For example, AutoLoop output video created using consensus AutoLoop operations may be played back as a short video and/or an animated GIF or PNG file created using the start frames and loop period. For an AutoLoop output video created using per-pixel AutoLoop operations, a custom media player may be required to play different loops for each pixel within the AutoLoop output video.

Although the FIG. 2 generally references an AutoLoop pipeline operation, persons of ordinary skill in the art would be aware that this disclosure is not limited to this particular pipeline. For instance, other embodiments may process one or more steps in parallel and/or modify the sequential order for implementing one or more steps. Using FIG. 2 as an example, operation 200 may implement steps 206 and 210 prior to performing pregate operation 207. Alternatively, operation 200 may perform all preprocessing and pregate operations after performing video stabilization at step 220. Moreover, operation 200 may add synthetic camera motion at step 226 after performing postgate operations 227. The use and discussion of FIG. 2 is only an example to facilitate ease of description and explanation.

Figure 7:
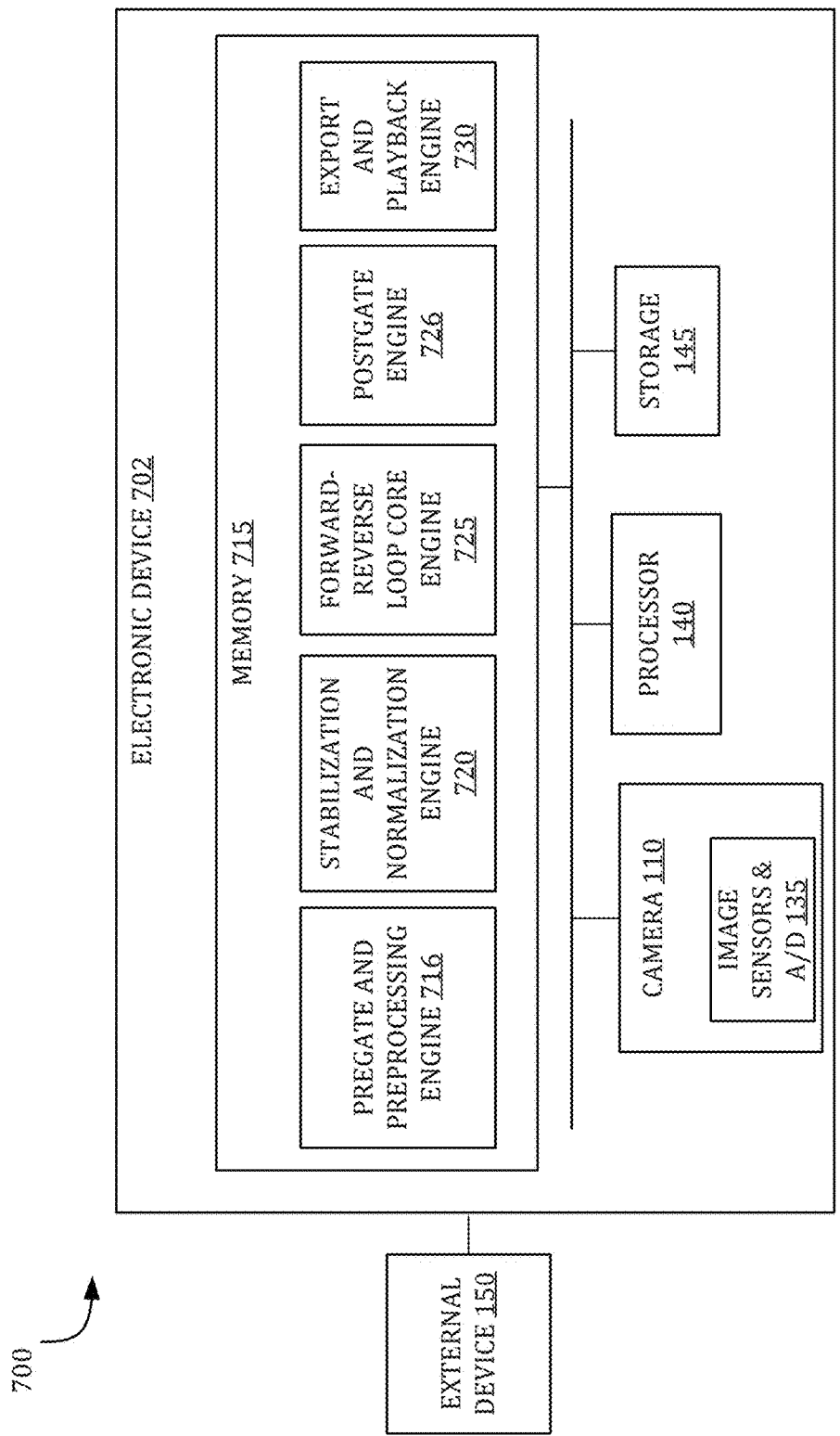
FIG. 7 shows, in block diagram form, an overall view of a system for creating a Forward-Reverse Loop output video.

FIG. 7 shows, in block diagram form, an overall view of a system 700 for creating a Forward-Reverse Loop output video. Similar to system 100 in FIG. 1, system 700 may create the Forward-Reverse Loop output video using casually shot, handheld input videos and do not require the input videos to be shot with a tripod. In one embodiment, system 700 may automate one or more operations to reduce the number of user's interaction needed to generate a Forward-Reverse Loop output video. For example, system 700 may generate a Forward-Reverse Loop once a user selects an input video or multiple images (e.g., a series and/or a sequence of images). System 700 may not request other user interactions, such as having a user manually identify loopable frames and/or manually using tools that offload the video content onto computer systems for additional processing. Additionally or alternatively, the system 700 may operate in an automatic mode, where system 700 further minimizes user interactions by automatically creating the Forward-Reverse Loop output video without having a user specify the input video or images at all. Instead, in automatic mode, system 700 may autonomously select and/or determine whether system 700 is able to create a Forward-Reverse Loop output for a given input video using pregate and postgate operations.

As shown in FIG. 7, to implement a Forward-Reverse Loop pipeline, system 700 includes an electronic device 702 that is similar to electronic device 105 shown in FIG. 1. Analogous to electronic device 105, the electronic device 702 could be connected to other network devices across a network, as well as network storage devices. Examples embodiments of the electronic device 702 include a laptop computer, a smart phone, and/or any other electronic devices configured to obtain and process videos and images in accordance with this disclosure. The electronic device 702 may also contain components, such as a camera 110, image sensors & analog-to-digital converters (S&A/D) 135, central processing unit (CPU) 140, and data storage 145, that are also located within electronic device 105 in FIG. 1.

Memory 715 of the electronic device 702 is similar to memory 115 shown in FIG. 1 except that memory 715 may store various processing engines for creating a Forward-Reverse Loop output video. As shown in FIG. 7, the electronic device 702 may include a pregate and preprocessing engine 716, a stabilization engine 120, a Forward-Reverse Loop core engine 725, a postgate engine 726, and an export/playback engine 730. The pregate and preprocessing engine 716 may perform preprocessing operations to detect and trim around a point of interest that are similar to the AutoLoop's preprocessing operations, which are discussed in more detail at optional step 206 depicted in FIG. 2. As an example, the pregate and preprocessing engine 716 may be configured to detect a point of interest based on a variety of factors such as image quality, the degree of blur, the degree of camera motion, exposure changes, and/or focus changes. To quantify these factors, the pregate and preprocessing engine 716 may perform a variety of saliency measures, such as dynamism, optical flow, motion tracking, and/or stabilization analysis to detect the point of interest. In one embodiment, the pregate and preprocessing engine 716 may obtain information related to one or more of these factors by analyzing the metadata of the input video. In one or more other embodiments, the pregate and preprocessing engine 716 may analyze the images themselves (i.e., the image data) to determine these parameters. In still other embodiments, the pregate and preprocessing engine 716 may rely on both image metadata and image data to determine these parameters.

The pregate and preprocessing engine 716 may also perform pregate operations similar to optional step 207 illustrated in FIG. 7 except that the operations performed in the optional step 207 are reconfigured to detect video attributes known to produce relatively higher quality Forward-Reverse Loop output videos. Forward-Reverse Loop video sequences generally utilize different types of video content when compared to AutoLoops. For instance, AutoLoops typically work well with video content that are physics-driven, fluid-like (e.g., waterfalls, flowing water, trees), as well as naturally periodic motions (e.g., watermills and windmills) while Forward-Reverse Loops work better using human and manmade objects that appear to be equally natural played in a reverse time direction (e.g., human facial expressions and movement). The pregate and preprocessing engine 716 may use similar detectors and/or classifiers (e.g., junk detector, a face detector, a scene classifier, and/or motion features) as describe above to score Forward-Reverse Loop compatibility of the input video. As an example, the pregate and preprocessing engine 716 may use a face detector to detect one or more human faces in an input video and subsequently compute a higher pregate score because of the human faces. In contrast to an AutoLoop context, the detection of human faces would lower the pregate score since human faces typically do not generate a relatively high quality AutoLoop output video. Other detectors and/or classifiers previously described, such as the junk detector, scene classifier, and/or motion feature detectors, may also be adjusted in a similar manner to account for attributes known to generate higher quality Forward-Reverse Loop output videos.

The pregate and preprocessing engine 716 then outputs the processed input video to the stabilization and normalization engine 720. The stabilization and normalization engine 720 may perform stabilization operations substantially similar to the stabilization engine 120 discussed above for FIG. 1. The stabilization operations can include a cascade of video stabilization operations, such as a tripod-direct mode, a tripod-sequential mode, and/or a sequential-smoothing mode to smooth out jitter, shaking, and other unintended camera movements found in an input video. The stabilization and normalization engine 720 may also perform a frame-time normalization that resamples the input video to enforce a constant frame rate of the input video. The stabilization and normalization engine 720 may determine a target constant frame rate for the input video and resample the frames from the input video to produce the target constant framerate. Frame-time normalization is discussed in more detail in step 1024 of operation 1000 shown in FIG. 10.

The Forward-Reverse Loop core engine 725 subsequently receives the possibly trimmed, stabilized, and frame-time normalized input video from the stabilization and normalization engine 720. Using the received input video, the Forward-Reverse Loop core engine 725 determines the optimal loop parameters for generating a Forward-Reverse Loop video sequence. In one embodiment, the Forward-Reverse Loop core engine 725 may index the frames from the received input video and determine an optimal starting frame 's' and a length 'p' of the forward segment of the Forward-Reverse Loop video sequence. By determining the optimal starting frame 's' and length 'p' loop parameters, the Forward-Reverse Loop core engine 725 also determines the optimal reversal points for a Forward-Reverse Loop video sequence. In one embodiment, to determine the optimal starting frame 's' and length the Forward-Reverse Loop core engine 725 may perform a Forward-Reverse Loop operation that uses an energy function that penalizes the differences between frames the received input video expects to play after a reversal point and the frames that are actually played according to the Forward-Reverse Loop output video, such as the frames leading up to the reversal point played in a backward direction. The Forward-Reverse Loop operation and Forward-Reverse Loop output video is discussed in more detail in FIGS. 8 and 9. The Forward-Reverse Loop core engine 725 then provides the Forward-Reverse Loop output video to the postgate engine 726 for evaluation.

Similar to the postgate engine 126 discussed in FIG. 1, the postgate engine 726 may determine whether a Forward-Reverse Loop output video generated from the determined loop parameters produces a relatively high quality video loop. Although a Forward-Reverse Loop core engine 725 may determine loop parameters that produce a Forward-Reverse Loop output video, the Forward-Reverse Loop output video may not contain enough motion for a user to detect or be of interest to a user. Similar to the postgate engine 126, the postgate engine 726 may analyze one or more dynamism parameters for various pixels in the Forward-Reverse Loop output video. If the postgate engine 726 determines that based on the dynamism parameters the Forward-Reverse Loop output video is a relatively low quality Forward-Reverse Loop and/or not a relatively high quality Forward-Reverse Loop, the postgate engine 726 may automatically discard and reject the Forward-Reverse Loop output video, notify a user of this action and/or prompt a user that the Forward-Reverse Loop output video does not meet a quality threshold and inquire whether the user chooses to discard the Forward-Reverse Loop output video. The postgate thresholds used to determine whether the Forward-Reverse Loop output video is relatively high quality may differ from ones used by the AutoLoop output video.

The export and playback engine 730 may be similar to the export and playback engine 130 shown in FIG. 1. Similar to playback engine 130, the export and playback engine 730 may be configured to create a playback version of the Forward-Reverse Loop generated from the Forward-Reverse Loop engine 725. In one embodiment, the export and playback engine 730 may implement an offline rendering operation to generate and output a playback file. The offline rendering operation could balance tradeoff between memory usage and computing latency (e.g., disk Input/Output (I/O) latency). For example, the export and playback engine 730 could read a chunk of frames (e.g., 16 frames) into memory when rendering one or more portions of the Forward-Reverse Loop output video. Offline rendering of the Forward-Reverse Loop output video is discussed in more detail in step 1030 of FIG. 10 and FIG. 11. In another embodiment, the export and playback engine 730 could perform a real-time playback of the Forward-Reverse Loop output video in a custom media player. For example, an audio/video media framework, such as AVFoundation, may be used to create the custom media player to playback the Forward-Reverse Loop output video in real-time. Real-time playback of output video variations, such as Forward-Reverse Loop output video, is discussed in more detail in FIG. 16.

FIG. 8 illustrates an embodiment of an input video 802 and an embodiment of a Forward-Reverse Loop output video 804. FIG. 8 illustrates that an input video 802 includes a sequence of frames of 's−2p', 's−2p+1' . . . 's−1', 's', 's+1' . . . 's+2p−2', and 's+2p−1'. Prior to performing a Forward-Reverse Loop operation on the input video 802, the input video 802 may have undergone preprocessing, stabilization, and frame-time normalization operations to produce a trimmed stabilized video that has a constant frame rate. The loop parameter 's' within the input video 802 represents a selected start frame and 'p' represents the length in frames of a forward segment 806 of a Forward-Reverse Loop output video 804. Frames from 's−2p' to 's−1' and 's+p' to 's+2p−1' represent frames in the input video 802 that are not part of the Forward-Reverse Loop output video 804.

The Forward-Reverse Loop output video 804 is an embodiment of a video loop after applying the input video 802 to a Forward-Reverse Loop operation (e.g., using the Forward-Reverse Loop core engine 725 in FIG. 7). As shown in FIG. 8, the Forward-Reverse Loop output video 804 includes a Forward-Reverse Loop video sequence 812 that consists of frames 's', 's+1' . . . 's+p−1', 's+p−2', 's+p−3', . . . , 's+2', 's+1'. The frame sequence from 's' to 's+p−1' represents the forward segment 806 of the Forward-Reverse Loop video sequence 812, and the frame sequence from 's+p−2' to 's+1' represents the reverse segment 808 of the Forward-Reverse Loop video sequence 812. In other words, the forward segment 806 plays the frame sequence in a forward time direction (e.g., 's' to 's+p−1') and the reverse segment 808 plays the previous frames leading up to the reversal point (e.g., 's+p−2' to 's+1') in a reverse time direction. For example, frame 's+1' is played before frame 's+2' in the forward segment 806 because frame 's+1' is captured at a point in time that precedes the capture time of frame 's+2'. Conversely, frame 's+2' is played before 's+/' in the reverse segment 808 also because of the capture time of the frames. As shown in FIG. 8, the Forward-Reverse Loop video sequence 812 is repeated once within the Forward-Reverse Loop output video 804. Other embodiments of the Forward-Reverse Loop output video 804 could include more than one repetition of the Forward-Reverse Loop video sequence 812.

FIG. 8 illustrates that the Forward-Reverse Loop output video 804 includes reversal points 810 and 814. The reversal point 810 is located at the boundary of the forward segment 806 and the reverse segment 808, which is also the location where the 's+p−1' frame ends. In FIG. 8, after reversal point 810, rather than having the Forward-Reverse Loop video sequence 812 continue to the next expected frame (e.g., 's+p' or 's−p') according to the input video 802 or loop back to starting frame 's' of the video loop as in an AutoLoop, the Forward-Reverse Loop video sequence 812 progresses to reverse segment 808 to play the preceding frames (e.g., 's+p−2') in a reverse time direction. The other reversal point 814 is located at the boundary between two Forward-Reverse Loop video sequences 812. At reversal point 814, the Forward-Reverse Loop output video 804 transitions from playing a frame sequence in a reverse time direction to playing the frame sequence in the forward time direction. As shown in FIG. 8, the Forward-Reverse Loop output video 804 does not include any crossfades. Crossfades may be excluded because the frames around the reversal points 810 and 814 tend to be similar, and the transitions at the reversal points 810 and 814 may be less abrupt than AutoLoops.

FIG. 9 is a diagram of the sequence of frames 900 from an input video that may be used to determine optimal loop parameters for a Forward-Reverse Loop output video. In one embodiment a Forward-Reverse Loop operation attempts to minimize the temporal discontinuity when determining optimal loop parameters 's' and 'p'. As shown in FIG. 9, the temporal discontinuity may occur after reaching the reversal points 810 and 814. Rather than playing expected frames located in frame sequences 902 and 906, frames within the Forward-Reverse Loop video sequence 904 are actually played in an opposite direction after reaching the reversal points 810 and 814. Using FIG. 9 as an example, a Forward-Reverse Loop output video starts on frame 's' and plays in a forward time direction until reaching reversal point 810. Once the Forward-Reverse Loop output video completes playing frame 's+p−1', the Forward-Reverse Loop output video then plays the Forward-Reverse Loop video sequence 904 in a reverse time direction rather than continuing in a forward time direction to play frames within the frame sequence 906. In particular, after reaching reversal point 810, the Forward-Reverse Loop output video plays the preceding frame 's+p−2' instead of playing the expected frame 's+p' according the input video. The Forward-Reverse Loop output video continues to play in the reverse time direction until reaching reversal point 814. After reaching reversal point 814, the Forward-Reverse Loop output video transitions back into a forward time direction by playing frame 's+1' instead of frame 's−1' found within frame sequence 902.

In one embodiment, the Forward-Reverse Loop operation can minimize the temporal discontinuity by evaluating the differences between the expected frames according to the input video and the actual frames played according to the Forward-Reverse Loop output video after reaching reversal points 810 and 814. Specifically, the Forward-Reverse Loop operation can utilize an energy function that penalizes the differences between the expected frames found within frame sequences 902 and 906 and the actual played frames within the Forward-Reverse Loop video sequence 904. One illustrative energy function is provided below in equation 28.

$$\min\nolimits_{s,p} E_{mirror}(s, p) = \sum_{t=1}^{w} \{\|V(s+t) - V(s-t)\| + \|V(s+p-1+t) - V(s+p-1-t)\|\} \quad (28)$$

The variable w represents a buffer length, which corresponds to the number of frames the Forward-Reverse Loop operation compares at each reversal point 810 and 814. The expression 'V(s+t)−V(s−t)' represents the difference between expected frames and the actually played frames after reaching reversal point 814 and expression 'V(s+p−1+t)−V(s+p−1−t)' represents the difference between expected frames and the actually played frames after reaching reversal point 810. Determining the difference between two frames may be based on the average difference of each pixel within a color representation (e.g., YCbCr or RGB color representation), which was previously discussed in more detail with reference to equations 4 and 14. Based on the energy function shown in equation 28, the Forward-Reverse Loop operation may then select the set of loop parameters 's' and 'p' that produces the minimum differences between frames.

The loop parameter 'p' may be configured to control the length of the Forward-Reverse Loop output video by setting one or more limits. In one embodiment, the Forward-Reverse Loop operation may set a lower limit of the loop parameter 'p' to maintain an appropriate minimum length.

For example, the loop parameter 'p' can be set to a length of one second worth of frames (e.g., a length of 30 frames for a 30 fps video). Additionally or alternatively, the Forward-Reverse Loop operation may set and enforce a maximum length for the loop parameter 'p'. In some instances a maximum length for loop parameter 'p' may not be used because the maximum length may already be bounded by the input video's length.

The Forward-Reverse Loop operation may also be configured to set one or more limits for the buffer length w. In one embodiment, the Forward-Reverse Loop operation may enforce a buffer length w to include at least one frame. In other embodiments, the buffer length w may be set to a length that is able to store the frames captured during one and a half seconds so as to capture as much continuity information as possible. The buffer length w may be shortened if the input video is relatively short in order to maintain enough frames for the Forward-Reverse Loop video sequence 904.

Figure 10:
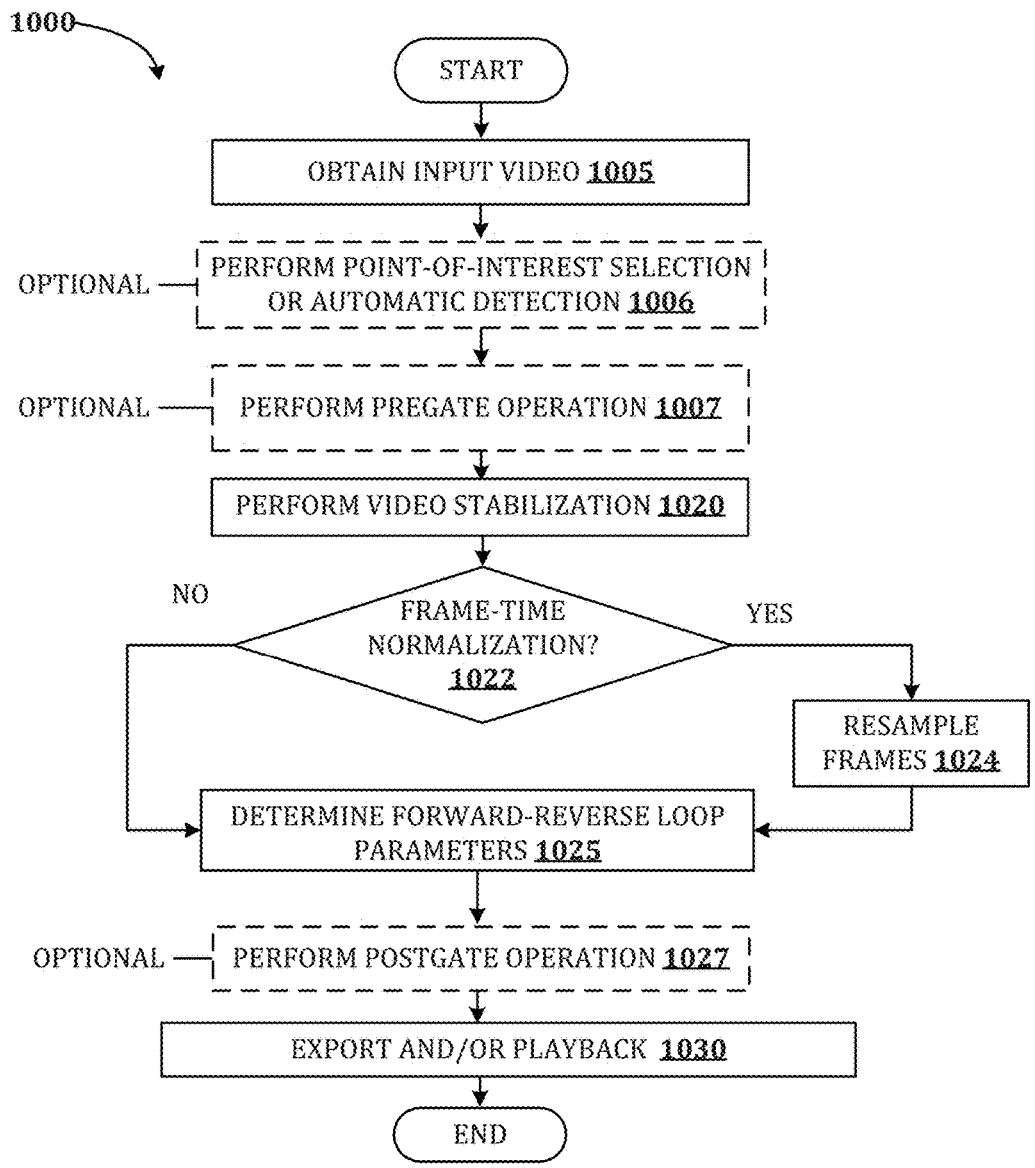
FIG. 10 depicts a flowchart illustrating a method for a Forward-Reverse Loop operation in accordance with one embodiment.

FIG. 10 depicts a flowchart illustrating a method 1000 for a Forward-Reverse Loop operation in accordance with one embodiment. In one embodiment, operation 1000 may be implemented within the electronic device 702 illustrated in FIG. 7. Although FIG. 10 illustrates that the steps within operation 1000 are implemented in a sequential order, operation 1000 is not limited to this sequential order. For instance, one or more of the steps of operation 1000, such as step 1006 and step 1020 could be implemented in parallel operations and/or operation 1000 could implement step 1020 prior to implementing step 1006. The use and discussion of FIG. 10 is only an example to facilitate ease of explanation and is not intended to limit the disclosure to this specific example.

Operation 1000 may perform step 1005 by obtaining an input video and step 1006 to perform preprocessiong operations. Steps 1005 and 1006 can be perform similarly to operations described above for steps 205 and 206, respectively, shown in FIG. 2. Operation 1000 may then move to step 1007 to perform pregate operations. At step 1007, the operation 1000 may be configured to determine whether content of an input video are suitable for creating a Forward-Reverse Loop output video. Operation 1000 may implement a pass-fail decision and/or assign a pregate score using one or more image features. Operation 1000 may include analyzing image features using a junk detector, face detector, motion features, and/or other pregate classifiers to determine whether the input video could potentially produce a relatively high quality Forward-Reverse Loop. Operation 1000 may configure the detectors and/or classifiers previously described, such as the junk detector, scene classifier, and/or motion feature detectors to detect for attributes known to generate higher quality Forward-Reverse Loop output videos.

Operation 1000 may then move to step 1020 and perform video stabilization operations that are similar to the video stabilization operations discussed at step 220 of FIG. 2. The operation 1000 may then move to step 1022 to determine whether a frame-time normalization operation should be performed. As an example, operation 1000 may perform frame-time normalization when the frame rate drops for one or more segments in the input video. Having a constant frame rate for an input video simplifies the operations for determining optimal loop parameters for a Forward-Reverse Loop output video. At step 1022, if operation 1000 detects that the frame rate for the input video has a constant frame rate, then operation 1000 may move to step 1025. Conversely, if operation 1000 determines that the input video has a variable frame rate, then operation 1000 may move to step 1024. In one embodiment, operation 1000 may determine if the input video has a variable frame rate based on the metadata. For instance, operation 1000 may analyze the video header metadata to determine whether the input video has constant or variable frame rate. Additionally or alternatively, operation 1000 may readout the frame capture times and calculate the frame rate as a function over time.

At step 1025, operation 1000 enforces a constant frame rate on the input video by resampling the input video at a target frame rate. Operation 1000 may determine the target frame rate for the input video by estimating an average frame rate for the input video. Using the estimated average frame rate, operation 1000 resamples the input video to generate an input video with a constant frame rate. In one embodiment, to produce the input video with the constant frame rate, operation 1000 at step 1025 may implement a gap bridging operation that blends frames for any gaps or missing frames (e.g., frame rate drops) that exists within the input video. Operation 1000 may initially fill the gap with repeating frames, usually using the frames on either side of the gap. Afterwards, operation 1000 may then perform a linear blend across the repeated frames using the frames at either side of the gap. Performing a linear blend provides a smoother transition when playing back the video sequence. Without performing a linear blend, using repeated frames to fill the gap could cause the appearance that the video content is static or stationary during playback. In one embodiment, the linear blend used at step 1025 could be similar to crossfade operation implemented for AutoLoops.

Operation 1000 may then move to step 1025 to determine optimal Forward-Reverse Loop parameters. As discussed with reference to FIG. 9, one embodiment of step 1025 could determine optimal Forward-Reverse Loop parameters 's' and 'p' based on the energy function shown in equation 28. Operation 1000 may also determine the reversal points for a Forward-Reverse Loop video sequence based on the optimal Forward-Reverse Loop parameters 's' and 'p'. The energy function shown in equation 28 minimizes the temporal discontinuity around the reversal points by penalizing the differences between the expected frames found within the input video and the actual played frames within the Forward-Reverse Loop video sequence. Additionally, operation 1000 may apply certain constraints to the loop parameter 'p' and the buffer length parameter 'w' used in the energy function to manage the length of the Forward-Reverse Loop output video. Other embodiments of step 1025 may use other types of loop parameters to generate a Forward-Reverse Loop output video that include, but are not limited to loop parameters related to optical flow, object tracking, and/or distorting the frame rate to minimize derivatives around different reversal points.

Operation 1000 may then proceed to optional step 1027 and perform postgate operations. At optional step 1027, operation 1000 may determine the relative quality of the Forward-Reverse Loop output video by analyzing dynamism parameters that are based on the variability and dynamic range for each pixel (or at least some of the pixels) of the Forward-Reverse Loop output video and/or parameters related to the pregate operations performed at optional step 1007. Similar to optional step 227, operation 1000 may determine the variability and dynamic range based on luminance and/or color intensity. By comparing the variability and dynamic ranges to one or more postgate thresholds, operation 1000 is able to determine whether the Forward-Reverse Loop output video produces a relatively high quality video loop. If operation 1000 determines that based on the dynamism parameters the Forward-Reverse Loop output video is a relatively low quality Forward-Reverse Loop and/or not a relatively high quality Forward-Reverse Loop, rather than moving to step 1030, operation 1000 may automatically discard and reject the Forward-Reverse Loop output video.

After operation 1000 finishes postgate operation 1027, operation 1000 may move to step 1030 to export and playback the Forward-Reverse Loop output video. As part of the export and playback operation, operation 1000 may render the Forward-Reverse Loop output video without a crossfade based on the loop parameters generated during step 1025. In one embodiment, operation 1000 may playback the Forward-Reverse Loop output video in real-time using a custom media player created from an audio/video media framework. Because the Forward-Reverse Loop output video typically may be relatively short videos, the custom media player may be configured to process and output a playback version of the Forward-Reverse Loop output video frame-by-frame.

In one another embodiment, operation 1000 may render the Forward-Reverse Loop output video offline. To render the Forward-Reverse Loop output video offline, operation 1000 may be unable to read frames in random order or even in reverse order. Because of this, at step 1030, the operation 1000 may utilize a rendering implementation that attempts to balance the tradeoff between memory usage and computing latency. In one embodiment, to decrease computing latency, frames for a forward segment of a Forward-Reverse Loop video sequence may read into memory such that when operation 1000 renders frames belonging to a reverse segment of the Forward-Reverse Loop video sequence, the frames from the reverse segment do not need to be individually read again. The potential drawback is that operation 1000 may consume more memory resources than practical for an electronic device if the number of frames read into memory is relatively large. In another embodiment, to save memory resources, operation 1000 may delete frames that are read into memory after rendering frames in the forward segment. However, operation 1000 would then need to individually re-read each frame into memory when rendering the reverse segment. This re-read of each frame into memory could cause the computing latency to become prohibitively long because of the lack of random frame access in the Forward-Reverse Loop video file. In another embodiment, operation 1000 may balance the tradeoff of memory usage and computing latency by reading a chunk of frames (e.g., 16 frames) into memory when rendering the reverse segment. After reading the chunk of frames, operation 1000 may delete each frame within the chunk after rendering each frame. Offline rendering using chunks of frames is discussed in more detail in FIG. 11.

Figure 11:
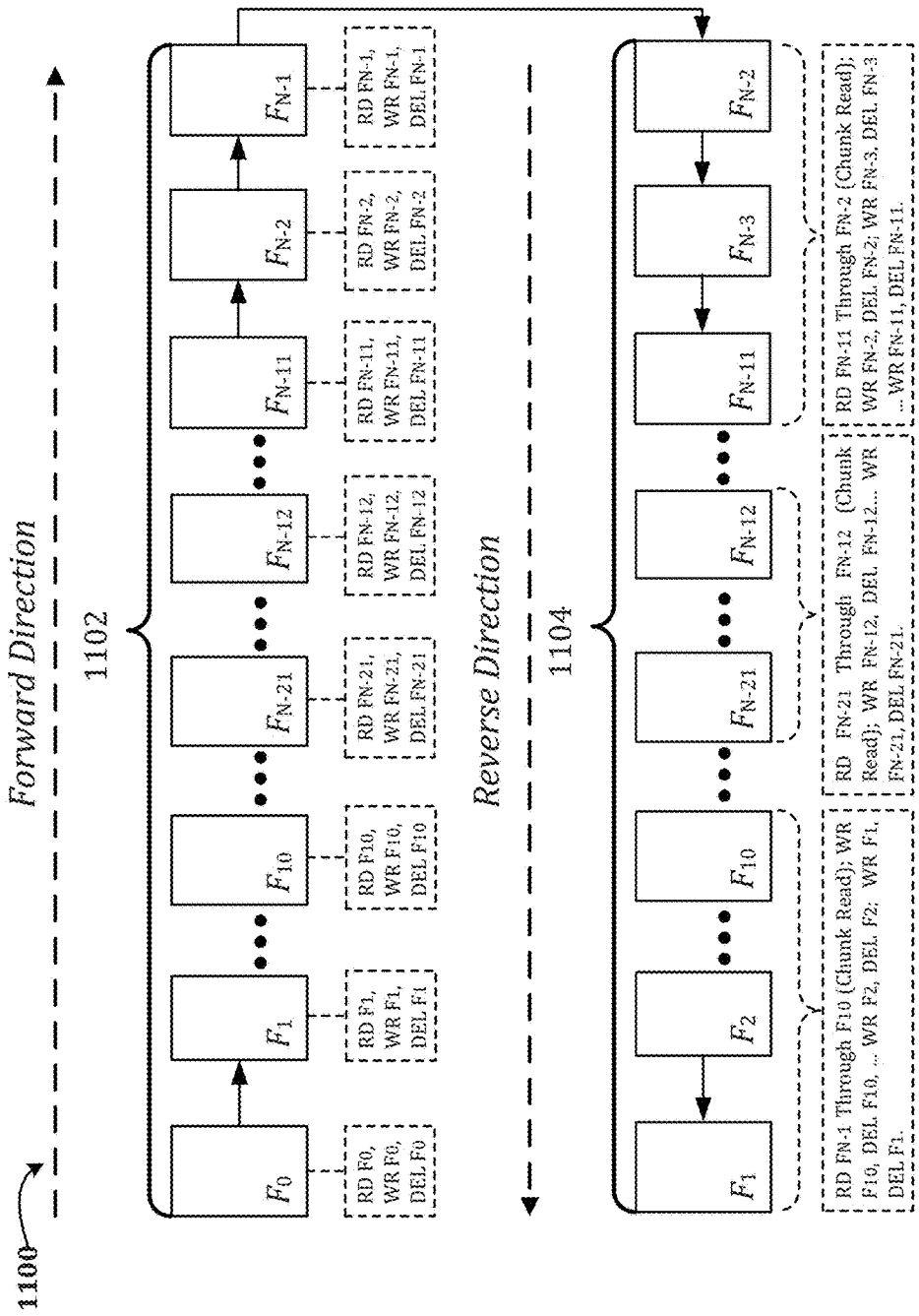
FIG. 11 illustrates an embodiment of a Forward-Reverse Loop rendering operation that implements chunk reading.

FIG. 11 illustrates one embodiment of an offline rendering of the Forward-Reverse Loop output video by reading chunks of frames. Given that the loop parameter 'p' has a length of n frames, a Forward-Reverse Loop video sequence 1100 that includes the forward segment 1102 and reverse segment 1104 would contain a total of 2n−2 frames. In FIG. 11, the frames are referenced as $F_0, F_1, \ldots F_{N-1}$ in the forward segment 1102 and referenced as $F_{N-2}, F_{N-3} \ldots F_1$ in the reverse segment 1104. When rendering the forward segment 1102, for each of the frames $F_0, F_1, \ldots F_{N-1}$, the rendering operation reads a frame into memory, writes it to an output file, and deletes the frame from memory to minimize memory resource consumption. When rendering the reverse segment 1104, the rendering operation reads a chunk of frames in a forward time direction and maintains the chunk of frames in memory until the frames are written to the output file in reverse order.

FIG. 11 illustrates that the size of the chunk of frames is set to ten frames. After the reversal point, the initial chunk reading starts at frame $F_{N-11}$ and reads 10 frames in a forward time direction, which as shown in FIG. 11 would be frame $F_{N-2}$. The frames $F_{N-11}$ to $F_{N-2}$ are saved in memory to improve the computing latency. The rendering operation subsequently writes frames $F_{N-11}$ to $F_{N-2}$ in a reverse time direction starting with frame $F_{N-2}$ and ending within frame $F_{N-11}$. When each frame is written to the output file, each frame is then deleted from memory to reduce memory usage. As shown in FIG. 11, after reading the first chunk of frames, the rendering operation writes frame $F_{N-2}$ into the output file and deletes the frame from memory, subsequently moves to frame $F_{N-3}$ and writes the frame to the output file and deletes frame $F_{N-3}$ from memory, and so forth. Once the rendering operation writes the last frame in the chunk of frames (e.g., frame $F_{N-11}$) to the output file and deletes the frame from memory, the rendering operation moves to the next chunk of frames (e.g., $F_{N-12}$ to $F_{N-21}$) and repeats the rendering operation as described for frames $F_{N-11}$ to $F_{N-2}$. The render operation continues reading chunks of frames until the last frame in the reverse segment (e.g., $F_1$) has been written into the output file and deleted from memory. In a preferred embodiment, the chunk size to render the Forward-Reverse Loop video sequence 1100 could be set to 16 frames.

Figure 12:
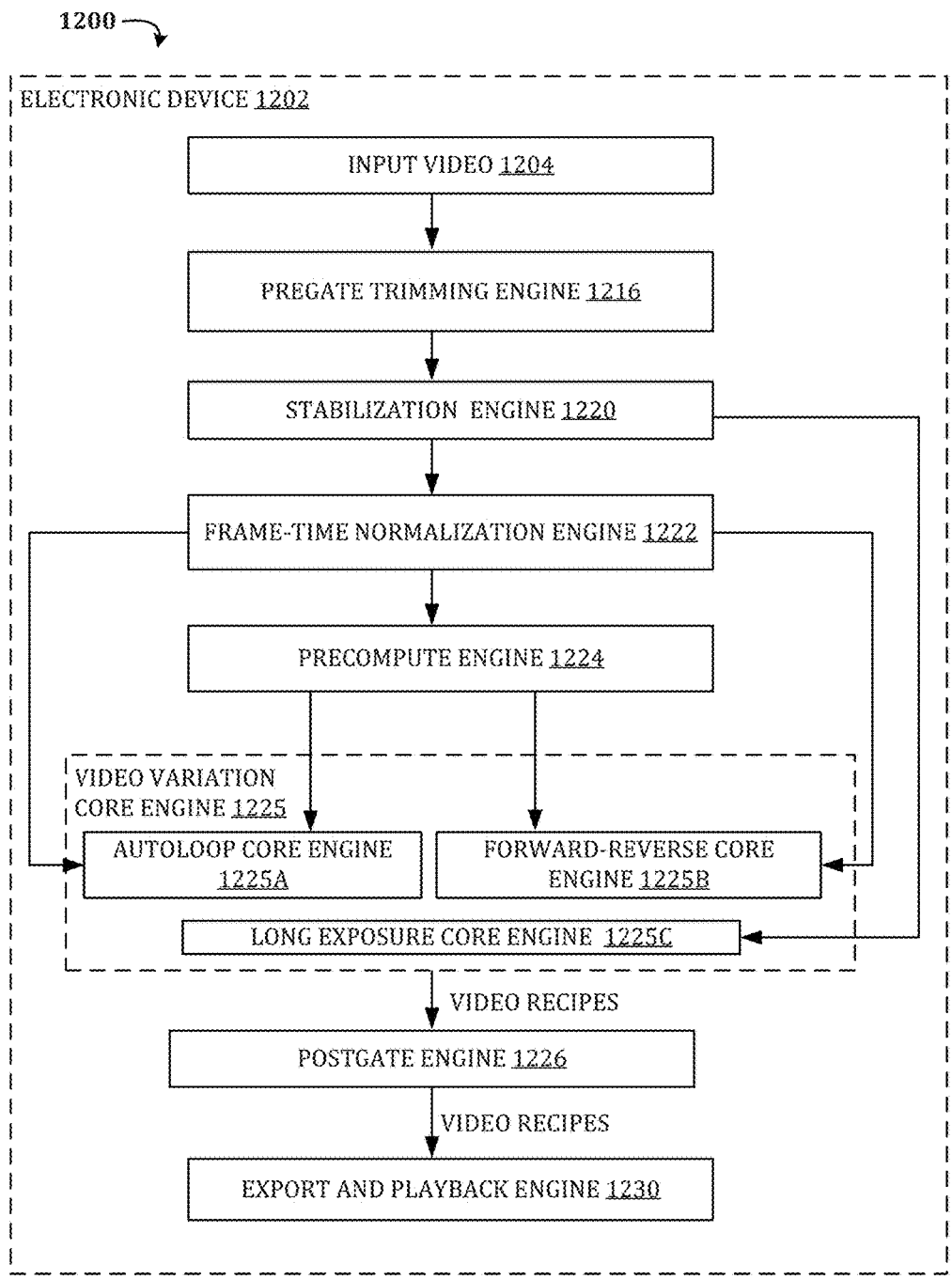
FIG. 12 illustrates, in block diagram form, an embodiment of a shared resource architecture for creating multiple output video variations.

FIG. 12 illustrates, in block diagram form, an embodiment of a shared resource architecture 1200 for creating multiple output video variations. As shown in FIG. 12, the shared resource architecture 1200 can be implemented within an electronic device 1202, which may be similar to the electronic devices 102 and 702 shown in FIGS. 1 and 7, respectively. Instead of having independent processing pipelines to create and/or playback each output video variation, the shared resource architecture 1200 can utilize and share common computational and gating results. By doing so, the shared resource architecture 1200 may reduce the number of redundant operations and overall computation time that would result from creating several output video variations using independent processing pipelines. The shared resource architecture 1200 may also start and/or complete the creation of several output video variations at varying times. In some instances, the varying creation times may depend on when the shared computational and gating results become available. For example, a Long Exposure output video may be ready for playback before an AutoLoop output video and/or a Forward-Reverse output video because producing the Long Exposure output video may not involve frame-time normalization and/or optimization of looping parameter operations.

FIG. 12 illustrates that the shared resource architecture 1200 directs the input video 1204 to the pregate trimming engine 1216, which is then able to perform preprocessing operations as described in the optional step 206 shown in FIG. 2 and the pregate and preprocessing engine 716 shown in FIG. 7. As an example, the pregate trimming engine 1216 may be configured to detect a point of interest based on a variety of factors such as image quality, the degree of blur, the degree of camera motion, exposure changes, and/or focus changes by analyzing the input video's 1204 metadata. Under the shared resource architecture 1200, rather than performing preprocessing operations for a single output video variation, the pregate trimming engine 1216 performs the preprocessing operations to determine one or more trim points for the multiple output video variations. In one embodiment, the pregate trimming engine 1216 may perform a hard trim that produces a single segment of the input video 1204 for creating the multiple output video variations. For example, the pregate trimming engine 1216 may trim out a single 2.5 second segment of the input video 1204 to use for creating an AutoLoop output video, a Forward-Reverse output video, and a Long Exposure output video. In another embodiment, the pregate trimming engine 1216 may perform a variable trim that trims out multiples segments of the input video 1204 for the different output video variations. The shared resource architecture 1200 may use each of the trimmed segments of the input video 1204 to produce one or more output video variations. For example, the pregate trimming engine 1216 may trim out a 2.5 second segment of the input video for the AutoLoop output video, use a one second portion of the 2.5 second segment for the Forward-Reverse output video, and use a 0.5 second portion of the 2.5 second segment for the Long Exposure output video.

The pregate trimming engine 1216 may also perform pregate operations, such as pregate operations described in the optional step 207 shown in FIG. 2 and the pregate and preprocessing engine 716 shown in FIG. 7. Recall that the pregate operations produce gating results that indicate whether the input video 1204 is suitable for creating an output video variation, such as an AutoLoop or Forward-Reverse Loop output video. For each output video variation, the pregate trimming engine 1216 may determine whether input video 1204 is suitable as a source video. If the pregate trimming engine 1216 determines the input video 1204 is not appropriate, the pregate trimming engine 1216 can perform a variety of actions ranging from halting the creation of the corresponding output video variation and/or generating a notification reporting that the input video 1204 is not suitable for creating the corresponding output video variation.

In the shared resource architecture 1200, the pregate trimming engine 1216 may reuse and/or share one or more gating results to determine whether the input video 1204 is compatible in creating one or more output video variations. To reduce computational redundancy and/or time within the pregate trimming engine 1216, the pregate trimming engine 1216 may share and utilize certain gating results that are common and applicable to multiple output video variations when performing other pregating operations. In particular, the pregate trimming engine 1216 may perform pregate operations that generate gating results that are relevant and can be shared with pregate operations for other output video variations. For instance, the pregate trimming engine 1216 may use one or more saliency measures (e.g., stabilization analysis) to determine whether the image quality of the input video 1204 is sufficient (e.g., if the input video 1204 is too unstable) for creating one of the output video variations, such as an AutoLoop output video. The pregate trimming engine 1216 may use the gating result from the single output video variation (e.g., AutoLoop output video) to determine whether the quality of the input video 1204 is suitable for creating other output video variations, such as a Forward-Reverse Loop output video and/or a Long Exposure output video.

The pregate trimming engine 1216 may also perform pregate operations that are custom to each output video variation, where the gating results are not shared with pregate operations for other output video variations. For instance, the pregate trimming engine 1216 may perform pregate operations that analyzes image features utilizing detectors (e.g., junk and face detectors) and classifiers (e.g., scene classifier) specifically configured based on the type of output video variation (e.g., pregate operations in optional steps 207 and 1007). As discussed above, for AutoLoop output videos, the pregate trimming engine 1216 may use detectors and classifiers that detect video content that are physics-driven, fluid-like, and have naturally periodic motions. Conversely, for Forward-Reverse Loop output videos, the pregate trimming engine 1216 may use detectors and classifiers that detect video content with human or manmade objects that appear to be equally natural played in a reverse time direction.

In FIG. 12, once shared resource architecture 1200 trims the input video 1204 and completes pregating analysis, the trimmed input video may be sent to the stabilization engine 1220. The stabilization engine 1220 performs stabilization operations on the trimmed input video similar to the stabilization engine 120 discussed above for FIG. 1. By way of example, similar to stabilization engine 120, stabilization engine 1220 may implement a cascade of stabilization operations. The stabilization engine 1220 may also produce gating results that may be applied to multiple output video variations. For example, if the stabilization engine 1220 subsequently determines that all of the stabilization operations within the cascade of stabilization operations fail, the stabilization engine 1220 may use the failure result to determine that the input video 1204 is not suitable for an AutoLoop output video. The stabilization engine 1220 may use the gating result for the AutoLoop output video and also determine that the trimmed input video is not suitable for one or more other output video variations (e.g., Forward-Reverse output video).

FIG. 12 illustrates that the shared resource architecture 1200 may forward the trimmed stabilized input video to both the video variation core engine 1225 and the frame-time normalization engine 1222. The video variation core engine 1225 may be able to produce one or more output video variations once the input video 1204 has been trimmed and stabilized. Passing a trimmed stabilized input video prior to completing a frame-time normalization operation could allow the shared resource architecture 1200 to create one or more output video variations quicker. As shown in FIG. 12, the trimmed stabilized input video may be sent to the Long Exposure core engine 1225C since the Long Exposure core engine 1225C may not need to have the input video normalized to properly operate. Performing a Long Exposure operation is described in more detail in U.S. Provisional Patent Application Ser. No. 62/514,226, filed on Jun. 2, 2017 and entitled "Synthetic Long Exposure Image with Optional Enhancement using a Guide Image," which is hereby incorporated by reference as if reproduced in its entirety. Other embodiments of the shared resource architecture 1200 could delay the creation of some of the output video variations by providing the processed input video to the Long Exposure core engine 1225C after performing frame-time normalization.

The frame-time normalization engine 1222 may perform frame-time normalization operations that are similar to the frame-time normalization operations described for stabilization and normalization engine 720 and step 1022 in operation 1000 of FIGS. 7 and 10, respectively. The frame-time normalization engine 1222 then provides the trimmed stabilized normalized input video to a precompute engine 1224. The precompute engine 1224 performs operations that produce computational results, such as video parameters, that the video variation core engine 1225 may use to create multiple output video variations. Stated another way, the precompute engine 1224 performs operations that produce one or more video parameters that are relevant in generating multiple output video variations. Precomputing computational results that are relevant to multiple output video variations ahead of time may reduce the computational time and the amount of other computing resources the video variation core engine 1225 would utilize to generate the multiple output video variations. Using FIG. 12 as an example, instead of having the AutoLoop core engine 1225A and the Forward-Reverse Core Engine 1225B perform similar and redundant computations, the precompute engine 1224 may perform computations that generate video parameters that can be shared with both the AutoLoop core engine 1225A and the Forward-Reverse Core Engine 1225B.

In one embodiment, the precompute engine 1224 may generate video parameters that include the frame differences between two or more of the frames (e.g., all frames) within the trimmed stabilized normalized input video. Recall that determining the difference between any given two frames may be based on a normalized difference of each pixel within a color representation (e.g., YCbCr or RGB color representation). For example, differences between any two frames can be determined as referenced in this disclosure during the explanation of equations 4 and 14. Computing frame differences within the trimmed stabilized normalized input video can be complex and involve a sizable amount of computational resources and processing time. By precomputing the frame differences, the shared resource architecture 1200 is able to reduce the amount of time the video variation core engine 1225 expends to compute the optimal loop parameters and/or other video parameters for multiple output video variations.

The video variation core engine 1225 may use the computational results received from the precompute engine 1224 and the trimmed stabilized normalized input video received from the frame-time normalization engine 1222 to compute optimal loop parameters and/or other video parameters to generate one or more of the output video variations. FIG. 12 illustrates that computational results determined from the precompute engine 1224 may be sent to the AutoLoop core engine 1225A and the Forward-Reverse Core Engine 1225B. In embodiments where the computational results include frame difference information of the trimmed stabilized normalized input video, the AutoLoop core engine 1225A and the Forward-Reverse core Engine 1225B may apply the frame difference information to the relevant energy functions to determine the minimal temporal discontinuity. As discussed above, the AutoLoop core engine 1225A may implement an energy function that differs from the Forward-Reverse Core Engine 1225B. For example, the AutoLoop core engine 1225A may implement an energy function (e.g., equation 4) that penalizes differences between an end of one loop to the beginning of the next loop, while the Forward-Reverse Core Engine 1225B may implement an energy function (e.g., equation 28) that penalizes the differences between the expected frames and the actual played frames.

After determining the optimal loop parameters and/or other video parameters, the video variation core engine 1225 may create and/or store each of the output video variations as a video recipe. For example, the video variation core engine 1225 could generate a video recipe for the AutoLoop output video, another video recipe for the Forward-Reverse output video, and a third video recipe for the Long Exposure output video. The video recipe includes the video content and frame instructions on how to form the output video variation. For example, the frame instructions could include the presentation timestamps for the received input video (e.g., trimmed stabilized normalized input video), the homographies to apply, and blend instructions, if any. The video recipe for each of the output video variation may be passed to the postgate engine 1226 to perform postgate operations.

Similar to the postgate engine 726 shown in FIG. 7 and optional step 227 shown in FIG. 2, the postgate engine 1226 may perform a variety of postgate operations to determine whether each generated output video variation is a relatively high quality video. Similar to the pregate trimming engine 1216, the postgate engine 1226 may perform postgate operations that are custom to each of the output video variations and/or produce gating results that may be shared with other postgate operations for other output video variations. For example, as referenced in optional step 227 in FIG. 2, postgate operations may include analyzing dynamism parameters that are based on variability and dynamic range for each pixel of one of the output video variations, such as an AutoLoop output video. Once the dynamic ranges for each pixel is computed for a specific output video variation, the postgate engine 1226 may use the dynamic range information to not only determine whether the specific output video variation (e.g., AutoLoop output video) is relatively high quality, but also whether other output video variations, such as the Forward-Reverse Loop output video, would be relatively high quality. By sharing gating results, the postgate engine 1226 is able to reduce its computation time and the amount of other computational resources to perform postgate operations.

As shown in FIG. 12, the video recipes may be passed from the postgate engine 1226 to the export and playback engine 1230. Other embodiments may have the export and playback engine 1230 receive the video recipe directly from the video variation core engine 1225. The export and playback engine 1230 may perform playback operations similar to the export and playback engine 130 and export and playback engine 730. In one embodiment, the export and playback engine 1230 may playback multiple output video variations by implementing offline rendering operations. In another embodiment, the export and playback engine 1230 may playback multiple output video variations in real-time. Real-time playback of one or more output video variations is discussed in more detail in FIG. 16.

Figure 13:
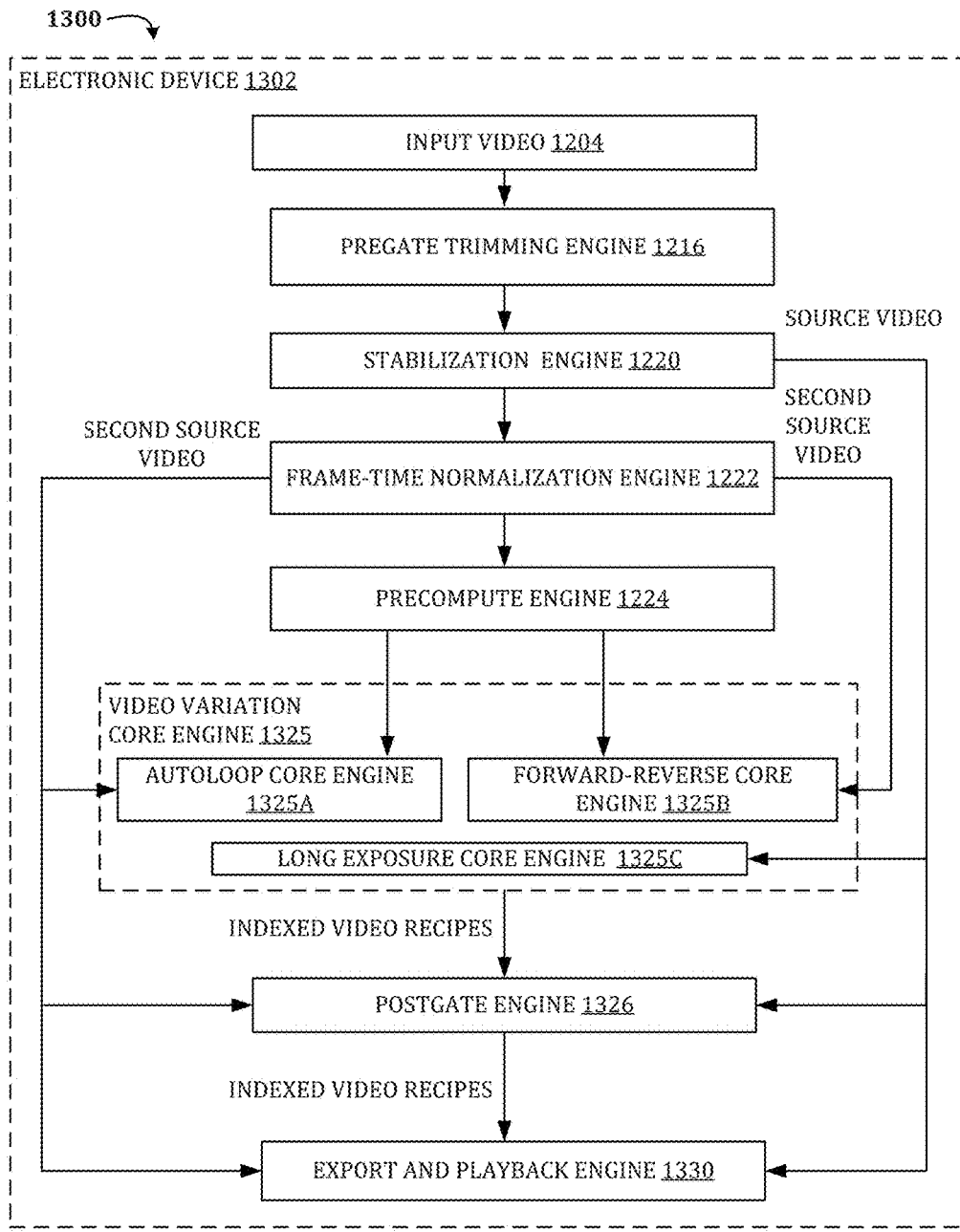
FIG. 13 illustrates, in block diagram form, another embodiment of a shared resource architecture for creating multiple output video variations.

FIG. 13 illustrates, in block diagram form, another embodiment of a shared resource architecture 1300 for creating multiple output video variations. The shared resource architecture 1300 is similar to the shared resource architecture 1200 except that rather than storing and/or creating video recipes, the shared resource architecture 1300 may store and/or create the output video variations using indexed video recipes. Generating and/or storing an indexed video recipe versus a video recipe may improve and simplify the playback operations for multiple output video variations. For instance, rather than having the export and playback engine 1330 independently playback frames for each output video variation, the export and playback engine 1330 may playback frames from one or more source videos and use the indexed video recipe to modify the source video to playback each of the output video variations.

The shared resource architecture 1300 is able to store one or more source videos associated with the indexed video recipes at various points in time. Using FIG. 13 as an example, once the electronic device 1302 obtains an input video 1204, the shared resource architecture 1300 may perform preprocessing, pregating, and stabilization operations using the pregate trimming engine 1216 and the stabilization engine 1220. As previously discussed, the shared resource architecture 1300 may use the trimmed stabilized input video to create one or more output video variations, such as a Long Exposure output video while other output video variations, such as AutoLoop and Frame-Reverse output videos, may use a trimmed stabilized normalized input video. In one embodiment, the shared resource architecture 1300 may store the trimmed stabilized input video as a source video after the stabilization engine 1220 completes stabilization operations. The shared resource architecture 1300 may use the source video later at the video variation core engine 1325, the postgate engine 1326, and/or the export and playback engine 1330. After the frame-time normalization engine 1222 generates a trimmed stabilized normalized input video, the shared resource architecture 1300 may store the trimmed stabilized normalized input video as second source video. Similar to the source video, the video variation core engine 1325, the postgate engine 1326, and/or export and playback engine 1330 can also use the second source video at a later point in time. Alternatively, both the source video and the second source video may be saved after the frame-time normalization engine 1222 completes its normalization operations. In other embodiments, the source video and the second source video may be saved after the video variation core engine 1325 generates the indexed video recipes.

The video variation core engine 1325 may produce multiple indexed video recipes based on the source video and the second source video. In FIG. 13, the AutoLoop core engine 1325A may produce an indexed video recipe corresponding to the second source video for an AutoLoop output video; the Forward-Reverse core engine 1325B may produce an indexed video recipe corresponding to the second source video for a Forward-Reverse output video; and the Long Exposure core engine 1325C may produce an indexed video recipe corresponding to the source video for a Long Exposure output video. An indexed video recipe may not include the actual frame information for the corresponding output video variation, and instead could include one or more video parameters, such as optimal loop parameters, and associated indices information corresponding to an input video. The indices information may include the start and end frame indexes of the input video that the shared resource architecture 1300 uses to generate an output video variation. In one embodiment, the indices information may also include the number of frames for the crossfade for an AutoLoop output video. In reference to FIG. 8 as an example, the indexed video recipe may include the loop parameter information for the 's' and 'p' loop parameters and indices information that includes a start frame index for frame 's' of the input video 802 and an end frame index for frame 's+p−1' of the input video 802.

Figure 14:
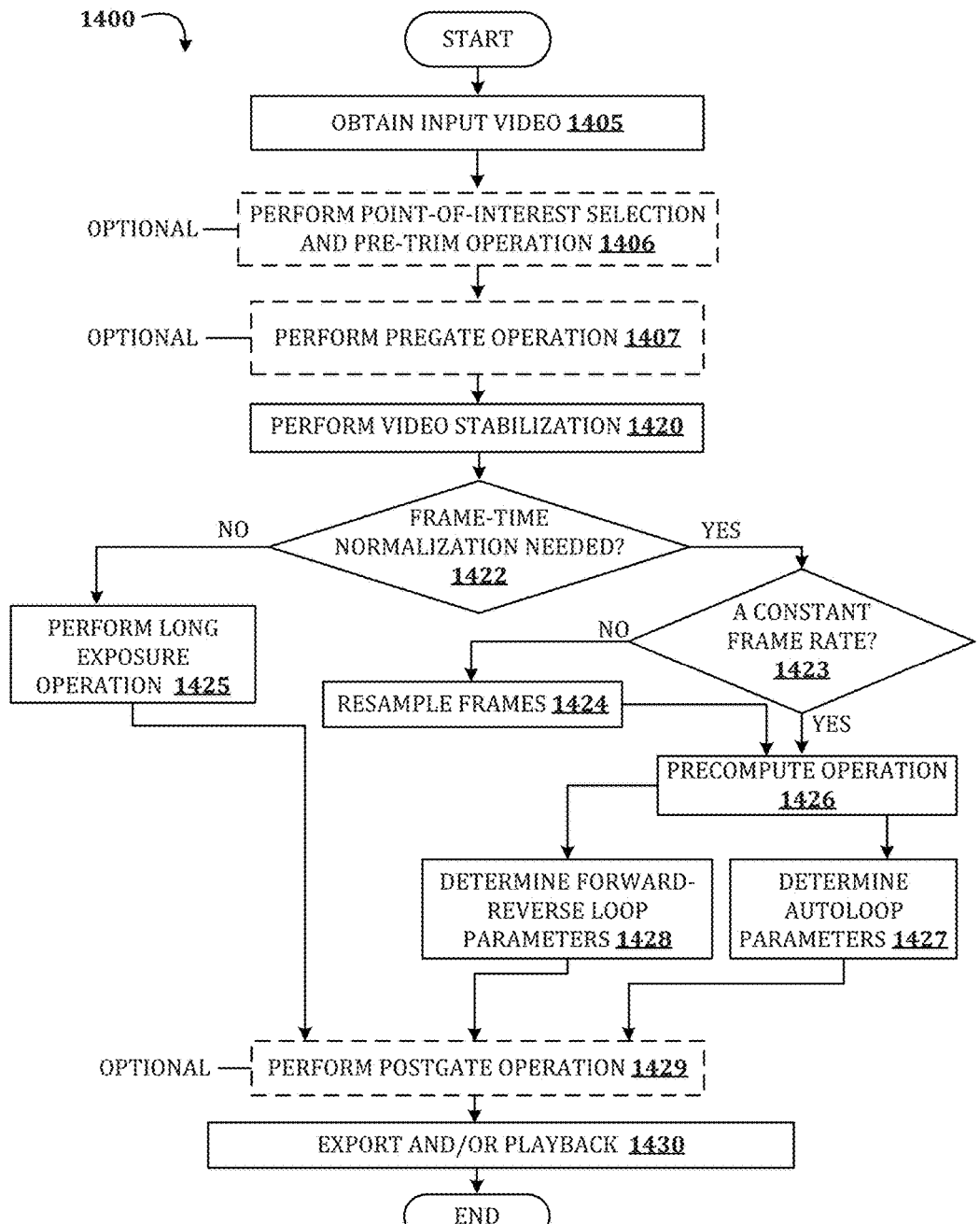
FIG. 14 depicts a flowchart illustrating a method for generating multiple output video variations in accordance with one embodiment.

FIG. 14 depicts a flowchart illustrating a method 1400 for generating multiple output video variations in accordance with the shared resource architecture 1200 and 1300. Although FIG. 14 illustrates that the steps within operation 1400 are implemented in a sequential order, operation 1400 is not limited to this sequential order. For instance, one or more of the steps of operation 1400, such as step 1406 and step 1420 could be implemented in parallel operations and/or operation 1400 could implement step 1420 prior to implementing step 1406. The use and discussion of FIG. 14 is only an example to facilitate ease of explanation and is not intended to limit the disclosure to the specific example.

For each output video variation, operation 1400 may perform step 1405 to obtain an input video, optional step 1406 to perform preprocessing operations, optional step 1407 to preform pregate operations, and step 1420 to preform video stabilization similar to operations described for the pregate trimming engine 1216 and stabilization engine 1220 shown in FIG. 12. At step 1422, operation 1400 may determine whether frame-time normalization is needed for each output video variation. Certain output video variations, such as a Long Exposure output video, may not need to have a source video with a constant frame rate. In those instances, operation 1400 would determine that no frame-time normalization is needed. For other output video variations, such as AutoLoop and Forward-Reverse output videos, operation 1400 would determine that frame-time normalization may be needed to determine optimal loop parameters.

If operation 1400 determines to not perform frame-time normalization for an output video variation, then operation 1400 may move to step 1425 to generate the output video variation. FIG. 14 depicts that an output video variation that may not need frame-time normalization is a Long Exposure output video. At step 1425, operation 1400 may perform a Long Exposure operation similar to operations as described for the Long Exposure core engine 1225C in FIG. 12. If operation 1400 determines that a frame-time normalization may be needed for the output video variation, then operation 1400 may move to step 1423.

At step 1423, operation 1400 may determine whether the trimmed stabilized input video has a constant frame rate. Step 1423 performs similar operations as described in step 1022 to determine whether a frame-time normalization operation should be performed to enforce a constant frame rate. As an example, operation 1400 may determine the input video has a variable frame rate based on the metadata. If the operation 1400 determines that the trimmed stabilized input video does not have a constant frame, operation 1400 moves to step 1424 to resample the frames similar to step 1025 of operation 1000 shown in FIG. 10. Afterwards, operation 1400 moves to step 1426. If operation 1400 determines that the trimmed stabilized input video has a constant frame rate, operation 1400 moves to step 1426 and performs a precompute operation, which is similar to operations described for the precompute engine 1224 shown in FIG. 12.

Operation 1400 may then move to steps 1427 and 1428 to determine optimal loop parameters for the AutoLoop output video and Forward-Reverse Loop parameter 1428, respectively. As discussed with reference to the AutoLoop core engine 1225A and Forward-Reverse core engine 1225B shown in FIG. 12, steps 1427 and 1428 may apply the computational results from the precompute operation 1426 to determine optimal loop parameters. Operation 1400 may then proceed to optional step 1429 and perform postgate operations that are similar to the postgate operations described for post gate engine 1226 shown in FIG. 12. After performing optional step 1429, Operation 1400 may continue to step 1430 to perform export and/or playback operations, which are similar to the export and/or playback operations described for the export and playback engine 1230.

Figure 15:
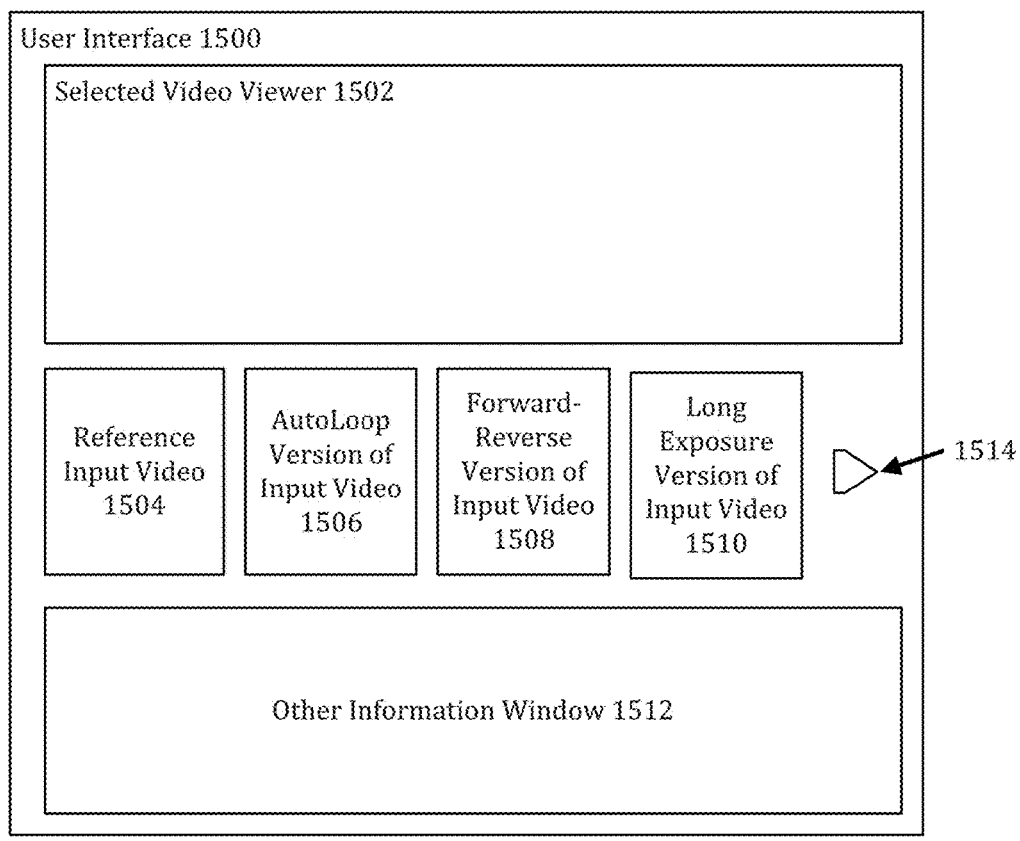
FIG. 15 illustrates a user interface for displaying multiple output video variations.

FIG. 15 illustrates a user interface 1500 for displaying multiple output video variations. In one embodiment, the user interface 1500 may display the multiple output video variations generated by the shared resource architectures 1200 and 1300 described in FIGS. 12 and 13, respectively. The user interface 1500 may include a selected video viewer 1502 that plays back the user-selected reference input video and/or output video variation. Shown beneath the selected video viewer 1502 are the reference input video 1504 and the different output video variations a user may be able to select from. As shown in FIG. 15, the user interface 1500 may include the AutoLoop version of the input video 1506, the Forward-Reverse version of the input video 1508, and the Long Exposure version of the input video 1510. The user interface 1500 may also include a scroll arrow 1514 for the user to scroll and see other potential output video variations. Underneath the reference input video 1504 and the different output video variations could include one or more other information windows 1512 that display other information related to the reference input video 1504. Using FIG. 15 as an example, the other information window 1512 could represent a map that locates where a user captured the reference input video 1504.

The user interface 1500 may be configured to open and activate on a display screen (e.g., display screen of the electronic device) based on one or more different viewing scenarios. As an example, the user interface 1500 may display after capturing an input video with the camera of the electronic device. Once the shared resource architectures 1200 or 1300 computes the video recipes or indexed video recipes, respectively, the user of the electronic device may prompt and provide the user an option to view the different output video variations. If the user inputs a selection indicating a desire to view the different output video variations, the electronic device may generate the user interface 1500 to display the output video variations. Other situations where the user interface 1500 could open and activate could occur as suggestions for recently taken input videos and/or images and/or when the electronic device has displaying an input video and/or image for a predetermined amount of time (e.g., about five seconds).

Figure 16:
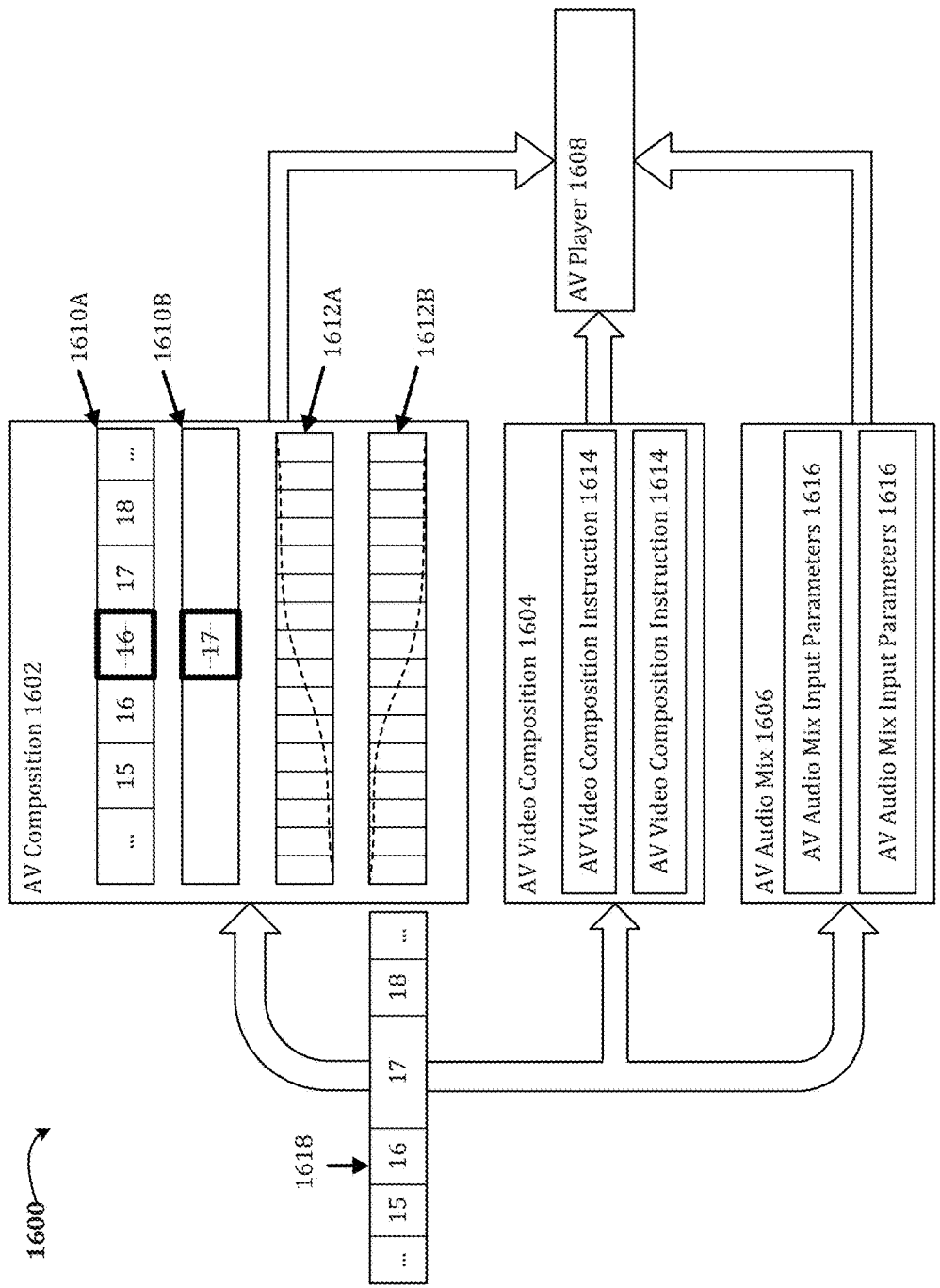
FIG. 16 illustrates an embodiment of an audio/video media framework for a custom media player that displays one or more output video variations in real-time.

FIG. 16 illustrates an embodiment of an audio/video media framework 1600 for a custom media player that displays one or more output video variations in real-time. Although the audio/video media framework 1600 in FIG. 16 may correspond to an AVFoundation framework, other types of audio/video media frameworks may be used to playback the one or more output video variations in real-time, frame-by-frame. To implement real-time playback, the audio/video media framework 1600 may utilize four components, AV Composition 1602, AV Video Composition 1604, AV Audio Mix 1606, and AV Player 1608. AV Composition 1602 represents the actual media timeline and is made up of tracks that represent audio, video, and/or other types of data or media. Each track can be made up of a number of time ranges where data is available. AV Video Composition 1604 includes AV video composition instructions 1614 that describe any additional image based effects that are to be performed on a per-frame basis and AV Audio Mix 1606 includes AV audio mix input parameters 1616 that describes the volume gain to apply to each audio track at any given time. Finally, the AV Player 1608 ingests the composition, video composition, and audio mix to deliver the playback to a user interface, such as user interface 1500 described in FIG. 15.

As shown in FIG. 16, the media asset 1618 may include a set of frame instructions to create one or more output video variations (e.g., AutoLoop output videos). As an example, media asset 1618 may correspond to the video recipe generated from the shared resource architecture 1200 and/or the indexed video recipe and source video generated from the shared resource architecture 1300. The numbers within the media asset 1618 represent the frame number within the output video variation. Using FIG. 16 as an example, the number 15 represents the frame instructions for frame 15 of the output video variation and the number 16 represents the frame instructions for frame 16 of the output video variation. FIG. 16 also illustrates that the time duration of frame 17 is relatively longer than frames 15, 16, and 18.

The audio/video media framework 1600 may retime the frames of the media asset 1618 to smooth out any non-uniform timing rates in order to properly playback the media asset 1618 in real-time. The AV Composition's 1602 primary video track 1610A may be composed of a number of time ranges, where each time range corresponds to a frame instruction in the video recipe. When setting up the AV Composition 1602, the audio/video media framework 1600 may loop over the frame instructions within the media asset 1618 and for each frame instruction insert a time-range in the primary video track 1610A at the specified presentation output time. The time-range contains the input time and the input duration for each frame. Using FIG. 16 as an example, time-range 15 in the primary video track 1610A corresponds to the frame instruction for frame 15 for media asset 1618. To perform frame retiming, the time-ranges may be normalized to achieve a constant frame rate. Retiming the frames and setting each time-range for the video tracks 1610 to correspond to a frame instruction allows for a relatively higher granular representation for real-time playback.

When normalizing the time-ranges, the audio/video media framework 1600 may perform blending operations to achieve the constant frame rate. In FIG. 16, because frame 17 of the media asset 1618 is relatively longer, frames 16 and 17 may be blended together to enforce the constant frame rate. In one embodiment and as discussed above regarding the gap bridging operation, the audio/video media framework 1600 may perform a linear blend of frames 16 and 17. As part of the blending operation, the audio/video media framework 1600 may insert another time range into a secondary video track 1610B. FIG. 16 depicts that frame 17 is inserted in the secondary video track 1610B and frame 16 is repeated within the primary video track 1610A. The dashed lines indicates the blending operation utilizes the repeated frame 16 in the primary video track 1610A and frame 17 in the secondary video track 1610B.

In one embodiment, the media asset 1618 may also include audio information. The audio/video media framework's 1600 audio tracks 1612A and 1612B represent the audio information of the media asset 1618. FIG. 16 illustrates that similar to the video retiming, the audio track may also be retimed to a discrete number of segments over which the volume change is linear. Given enough granularity, and as shown in FIG. 16, the retiming operation may approximate a cosine attenuation for the output video variations. For one or more output video variations (e.g., AutoLoop output video) the audio/video media framework 1600 may utilize a specific type of audio mix characterized as being non-linear or equal-power audio cross-fade.

During the rendering stage, the audio/video media framework 1600 may leverage image filters (not shown in FIG. 16), such as CoreImage filters to perform actual rendering. To deliver a specific frame at a particular time 't', the audio/video media framework 1600 may perform a search (e.g., binary search) on frame instructions to get the frame instructions at the nearest corresponding time. The audio/video media framework may also extract the homography and stabilized crop rectangle associated with the frame instructions and apply these to the image filters. To render blending operations, the audio/video media framework 1600 may extract the associated blend factor as well as the homography and crop rectangle for the second frame and perform a blending operation using a blend image filter, such as the blend CoreImage filter.

Figure 17:
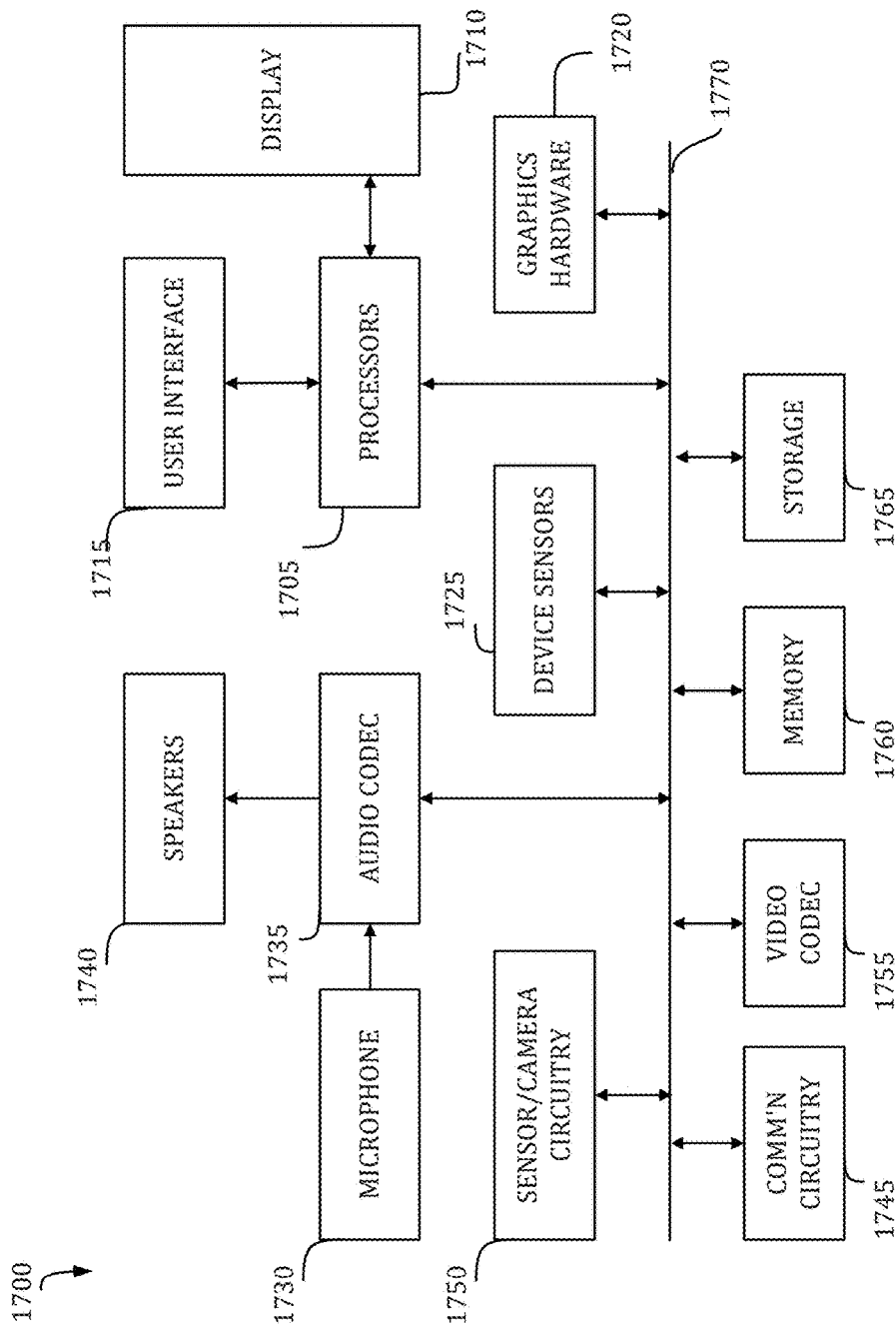
FIG. 17 is a simplified functional block diagram of an illustrative multi-functional electronic device, according to one embodiment.

FIG. 17 is a simplified functional block diagram of an illustrative multi-functional electronic device 1700, according to one embodiment. Electronic device 1700 may include processor 1705, display 1710, user interface 1715, graphics hardware 1720, device sensors 1725 (e.g., proximity sensor/ambient light sensor, accelerometer and/or gyroscope), microphone 1730, audio codec(s) 1735, speaker(s) 1740, communications circuitry 1745, digital image capture unit 1750, video codec(s) 1755, memory 1760, storage 1765, and communications bus 1770. Electronic device 1700 may be, for example, a personal digital assistant (PDA), personal music player, a mobile telephone, or a notebook, laptop or tablet computer system.

Processor 1705 may execute instructions necessary to carry out or control the operation of many functions performed by device 1700 (e.g., such as the generation and/or processing of time-lapse video in accordance with operation 200). Processor 1705 may, for instance, drive display 1710 and receive user input from user interface 1715. User interface 1715 can take a variety of forms, such as a button, keypad, dial, a click wheel, keyboard, display screen and/or a touch screen. Processor 1705 may be a system-on-chip such as those found in mobile devices and include a dedicated graphics-processing unit (GPU). Processor 1705 may represent multiple central processing units (CPUs) and may be based on reduced instruction-set computer (RISC) or complex instruction-set computer (CISC) architectures or any other suitable architecture and each may include one or more processing cores. Graphics hardware 1720 may be special purpose computational hardware for processing graphics and/or assisting processor 1705 process graphics information. In one embodiment, graphics hardware 1720 may include one or more programmable graphics-processing unit (GPU), where each such unit has multiple cores.

Sensor and camera circuitry 1750 may capture still and video images that may be processed to generate images in accordance with this disclosure. Sensor in sensor and camera circuitry 1750 may capture raw image data as RGB data that is processed to generate an AutoLoop output video. Output from camera circuitry 1750 may be processed, at least in part, by video codec(s) 1755 and/or processor 1705 and/or graphics hardware 1720, and/or a dedicated image-processing unit incorporated within circuitry 1750. Images so captured may be stored in memory 1760 and/or storage 1765. Memory 1760 may include one or more different types of media used by processor 1705, graphics hardware 1720, and image capture circuitry 1750 to perform device functions. For example, memory 1760 may include memory cache, read-only memory (ROM), and/or random access memory (RAM). Storage 1765 may store media (e.g., audio, image and video files), computer program instructions or software, preference information, device profile information, and any other suitable data. Storage 1765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1760 and storage 1765 may be used to retain computer program instructions or code organized into one or more modules and written in any desired computer programming language. When executed by, for example, processor 1705 such computer program code may implement one or more of the methods described herein.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, that presented herein. More generally, if there is hardware support some operations described in conjunction with FIGS. 2, 10, and 14 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer-readable storage medium, on which are stored instructions that, when executed, cause a programmable control device to:
   obtain a video;
   generate shared precompute results indicative of frame differences of frames within the video, wherein the shared precompute results are common to a first video loop effect and a second video loop effect;
   calculate different temporal discontinuities for the first and second video loop effects using the shared precompute results;
   determine a first set of loop parameters to generate a first output video having the first video loop effect using the shared precompute results;
   determine a second set of loop parameters to generate a second output video having the second video loop effect using the shared precompute results; and
   render the first output video and the second output video.

2. The non-transitory computer-readable storage medium of claim 1, wherein the instructions, when executed, further cause the programmable control device to:
   apply a frame-time normalization on an input video to enforce a constant frame rate to generate the video;
   stabilize and trim the video prior to applying the frame-time normalization on the video; and
   generate a third output video having a third video effect using the stabilized and trimmed video and without normalizing the video.

3. The non-transitory computer-readable storage medium of claim 1, wherein the instructions, when executed, further cause the programmable control device to render the first and second output videos in real-time based on a media framework.

4. The non-transitory computer-readable storage medium of claim 1, wherein the first output video having the first video loop effect comprises an AutoLoop output video and the second output video having the second video loop effect comprises a Forward- Reverse Loop output video.

5. The non-transitory computer-readable storage medium of claim 1, wherein the instructions, when executed, further cause the programmable control device to:
perform a first pregate operation on the video to generate a pre-gate result for the first output video, wherein the pre-gate result is indicative of stability of the video; and
perform a second pregate operation on the video based on the pre-gate result for the first output video.

6. The non-transitory computer-readable storage medium of claim 1, wherein the instructions, when executed, further cause the programmable control device to perform a hard trim of a captured video to extract a portion of the capture video to generate the video.

7. The non-transitory computer-readable storage medium of claim 1, wherein the instructions, when executed, further cause the programmable control device to:
perform a variable trim of a captured video to extract a plurality of video segments of the captured video; and
generate the video using one of the video segments.

8. The non-transitory computer-readable storage medium of claim 1, wherein the instructions, when executed, further cause the programmable control device to:
perform a first postgate operation on the first output video that determines a plurality of pixel dynamism results for the first output video; and
perform a second postgate operation for the second output video based on at least some of the pixel dynamism results for the first output video.

9. The non-transitory computer-readable storage medium of claim 1, wherein the instructions, when executed, further cause the programmable control device to:
generate a first index video recipe based on the first set of loop parameters, wherein the first index video recipe includes indices information to a source video without providing actual frame information associated with the source video; and
render the first output video based on the first index video recipe and the source video.

10. A computer-implemented method for sharing video information to generate multiple video outputs, comprising:
obtaining a video;
generating shared precompute results indicative of frame differences of frames within the video, wherein the shared precompute results are common to a first video loop effect and a second video loop effect;
calculating different temporal discontinuities for the first and second video loop effects using the shared precompute results;
determining a first set of loop parameters to generate a first output video having the first video loop effect using the shared precompute results;
determining a second set of loop parameters to generate a second output video having the second video loop effect using the shared precompute results; and
rendering the first output video and the second output video.

11. The computer-implemented method of claim 10, further comprising:
applying a frame-time normalization on an input video to enforce a constant frame rate to generate the video;
stabilizing and trimming the video prior to applying the frame-time normalization on the video; and
generating a third output video having a third video effect using the stabilized and trimmed video and without normalizing the video.

12. The computer-implemented method of claim 10, further comprising:
generating a first index video recipe based on the first set of loop parameters, wherein the first index video recipe includes indices information to a source video without providing actual frame information associated with the source video; and
rendering the first output video based on the first index video recipe and the source video.

13. The computer-implemented method of claim 10, further comprising:
performing a first pregate operation on the video to generate a pre-gate result for the first output video, wherein the pre-gate result is indicative of stability of the video; and
performing a second pregate operation on the video based on the pre-gate result for the first output video.

14. The computer-implemented method of claim 10, further comprising:
performing a first postgate operation on the first output video that determines a plurality of pixel dynamism results for the first output video; and
performing a second postgate operation for the second output video based on at least some of the pixel dynamism results for the first output video.

15. The computer-implemented method of claim 10, further comprising rendering the first and the second output videos in real-time based on a media framework.

16. An electronic device comprising:
an image sensor,
a memory comprising instructions stored thereon and operatively coupled to the image sensor, and
one or more processors operatively coupled to the memory and the image sensor, wherein the instructions cause the one or more processors to:
obtain a video;
generate shared precompute results indicative of frame differences of frames within the video;
calculate different temporal discontinuities for the first and second video loop effects using the shared precompute results;
determine a first set of loop parameters to generate a first output video having a first video loop effect using the shared precompute results;
determine a second set of loop parameters to generate a second output video having a second video loop effect using the shared precompute results;
display the first output video having the first video loop effect; and
display the second output video having the second video loop effect, wherein the second output video is displayed separately and independently from the first output video,
wherein the first video loop effect is different from the second video loop effect.

17. The electronic device of claim 16, wherein the memory further comprises instructions to cause the one or more processors to: display the first and the second output videos separately and independently in real-time based on a media framework.

18. The electronic device of claim 16, wherein the memory further comprises instructions to cause the one or more processors to:

perform a first pregate operation on the video to generate a pre-gate result for the first output video, wherein the pre-gate result is indicative of stability of the video; and perform a second pregate operation on the video based on the pre-gate result for the first output video.

19. The electronic device of claim 16, wherein the memory further comprises instructions to cause the one or more processors to:

perform a first postgate operation on the first output video that determines a plurality of pixel dynamism results for the first output video; and perform a second postgate operation for the second output video based on at least some of the pixel dynamism results for the first output video.

20. The electronic device of claim 19, wherein the memory further comprises instructions to cause the one or more processors to:

generate a first index video recipe based on the first set of loop parameters, wherein the first index video recipe includes indices information to a source video without providing actual frame information associated with the source video; and display the first output video based on the first index video recipe and the source video.

\* \* \* \* \*